(12) United States Patent
Yabuki et al.

(10) Patent No.: US 10,943,555 B2
(45) Date of Patent: Mar. 9, 2021

(54) LIQUID-CRYSTAL DISPLAY APPARATUS AND METHOD FOR CORRECTING IMAGE SIGNAL

(71) Applicant: SAKAI DISPLAY PRODUCTS CORPORATION, Sakai (JP)

(72) Inventors: Haruhito Yabuki, Sakai (JP); Shuhei Haga, Sakai (JP)

(73) Assignee: SAKAI DISPLAY PRODUCTS CORPORATION, Sakai (JP)

( * ) Notice: Subject to any disclaimer, the term of this patent is extended or adjusted under 35 U.S.C. 154(b) by 0 days.

(21) Appl. No.: 16/724,327

(22) Filed: Dec. 22, 2019

(65) Prior Publication Data

US 2020/0265793 A1 Aug. 20, 2020

Related U.S. Application Data

(60) Provisional application No. 62/808,012, filed on Feb. 20, 2019.

(51) Int. Cl.
*G09G 3/30* (2006.01)
*G09G 3/36* (2006.01)
*G02F 1/1343* (2006.01)

(52) U.S. Cl.
CPC ..... *G09G 3/3677* (2013.01); *G02F 1/134309* (2013.01); *G09G 3/3607* (2013.01); *G09G 3/3688* (2013.01); *G02F 2001/134345* (2013.01); *G02F 2203/30* (2013.01); *G09G 2310/027* (2013.01)

(58) Field of Classification Search
CPC ........ G09G 2300/0438–0895; G09G 3/34–38; G09G 2340/06–16
See application file for complete search history.

(56) References Cited

U.S. PATENT DOCUMENTS

| | | | |
|---|---|---|---|
| 2007/0046609 A1 | 3/2007 | Lee | |
| 2007/0195041 A1* | 8/2007 | Lee | G09G 3/2074 345/89 |
| 2010/0231617 A1* | 9/2010 | Ueda | G09G 3/3648 345/690 |
| 2017/0011690 A1* | 1/2017 | Oya | G09G 3/3426 |
| 2018/0218690 A1* | 8/2018 | Zhou | G09G 3/3406 |

* cited by examiner

*Primary Examiner* — Sanghyuk Park
(74) *Attorney, Agent, or Firm* — ScienBiziP, P.C.

(57) ABSTRACT

A disclosed liquid-crystal display apparatus comprises a display panel comprising a plurality of pixels, a plurality of scanning lines, and a plurality of data lines; and an image signal correction unit to correct a grayscale value determined in accordance with the transmittance the pixel is to have. The image signal correction unit carries out a first correction to bring a first grayscale value closer to a second grayscale value by a first correction amount determined based on the state of difference between the first grayscale value determined in accordance with the transmittance a first pixel is to have and the second grayscale value determined in accordance with the transmittance a second pixel selected following the first pixel is to have. The first correction is a correction for bringing the transmittance of the second pixel closer to the transmittance according to the second grayscale value.

19 Claims, 20 Drawing Sheets

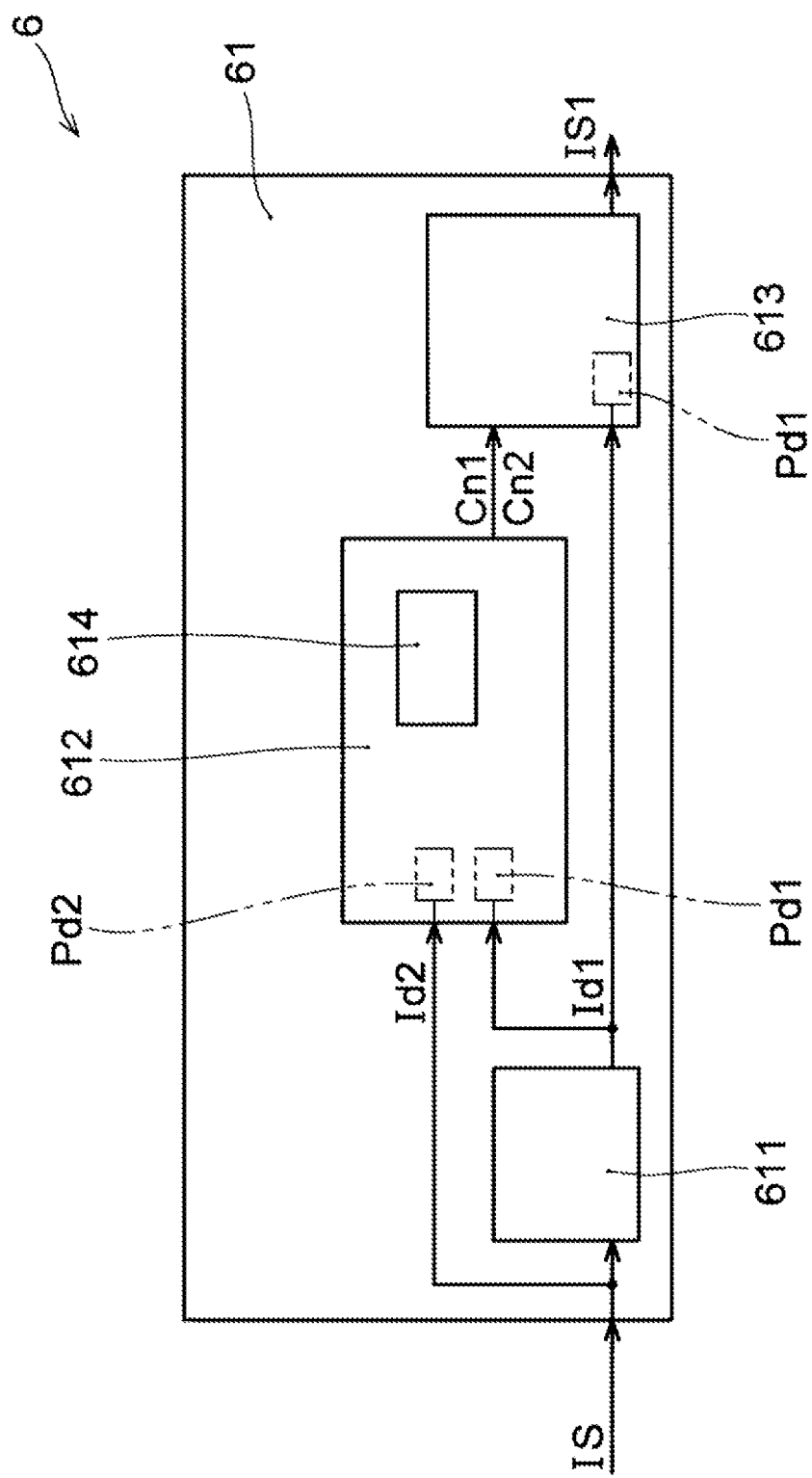

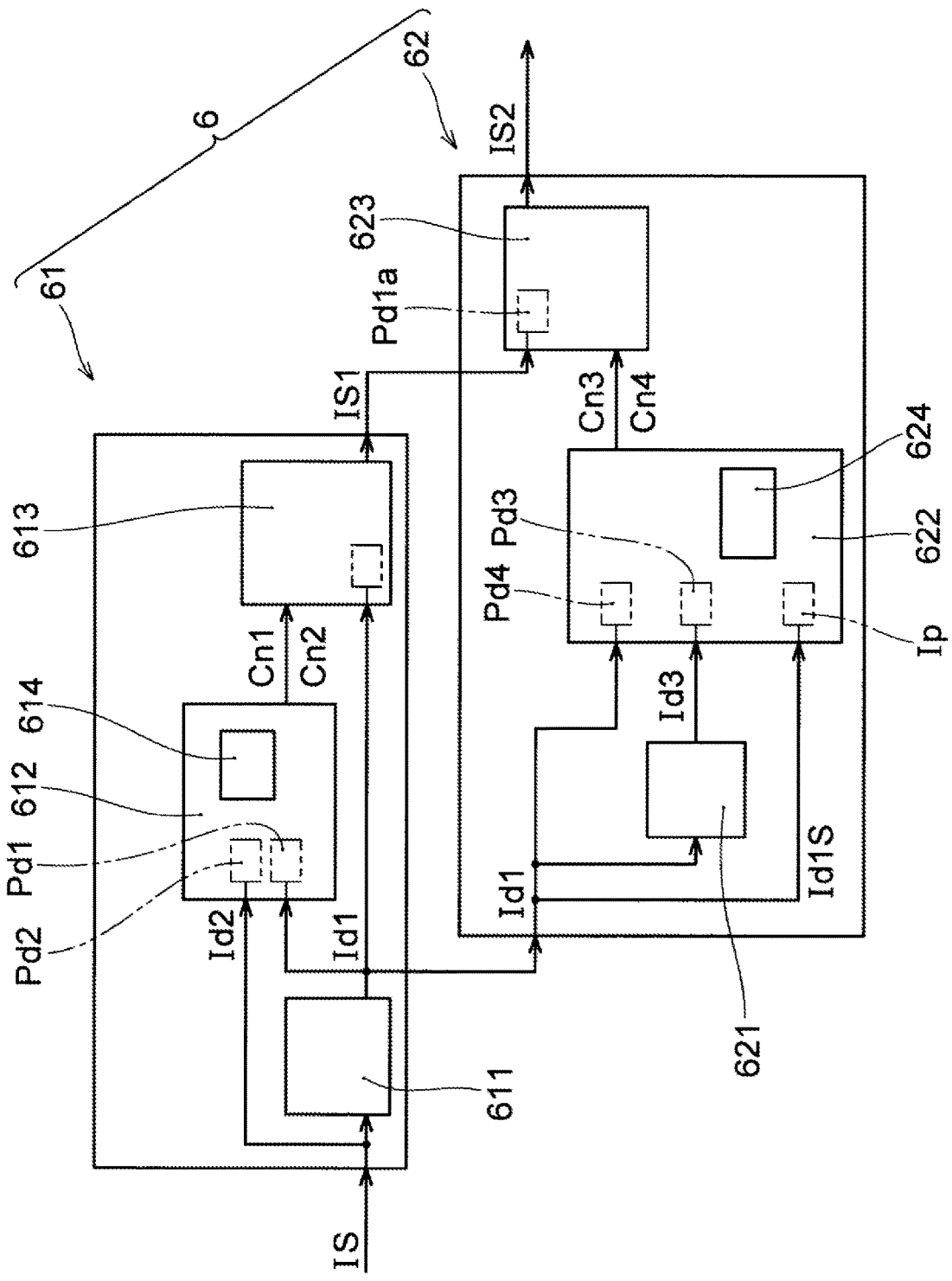

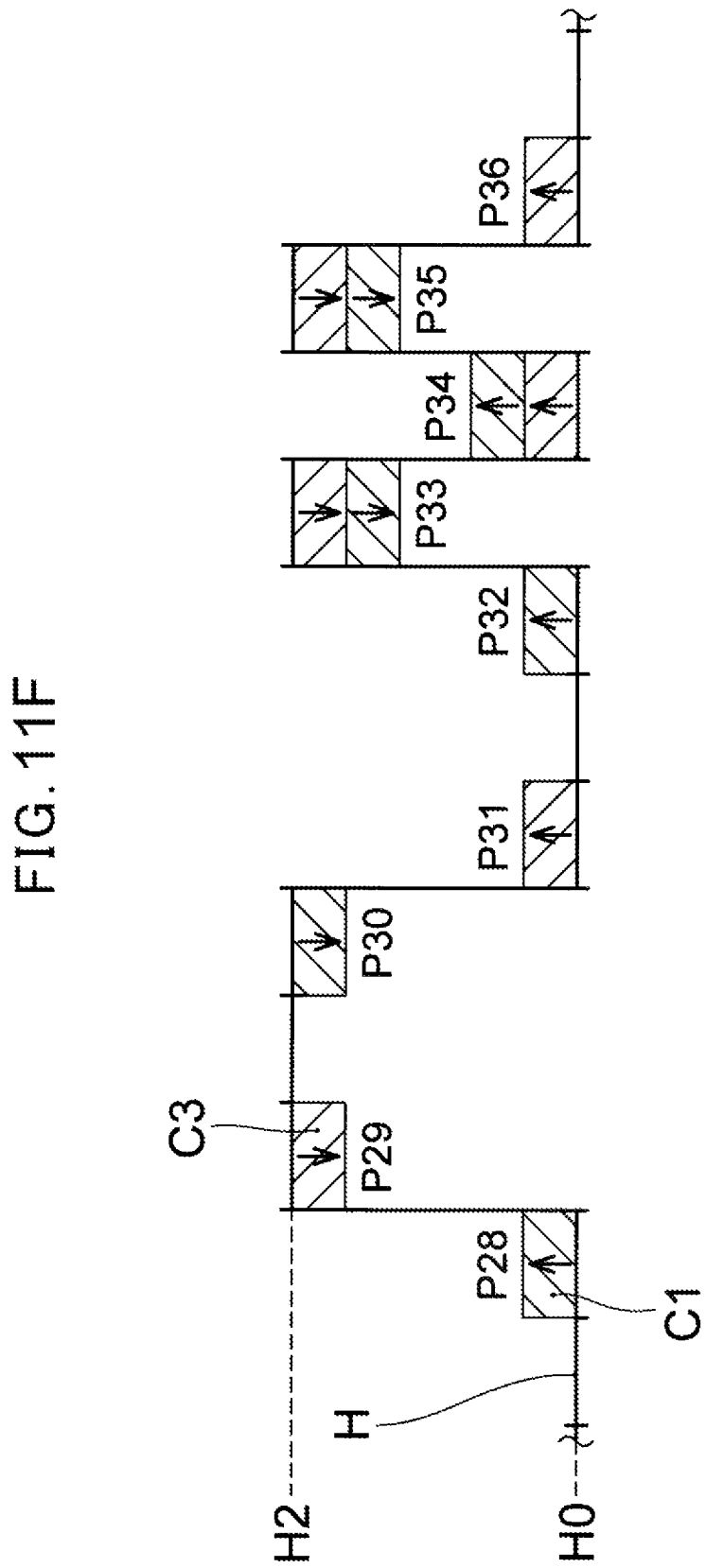

FIG. 13A

| | | \_614 | | | | SECOND GRAYSCALE VALUE | | | | | R1 |
|---|---|---|---|---|---|---|---|---|---|---|---|
| | | 0 | 1 | 2 | ... | 1024 | ... | 2048 | ... | 3072 | ... | 4094 | 4095 |
| | 0 | 0 | 0 | 0 | ... | +15 | ... | +40 | ... | +50 | ... | +65 | +70 |
| | 1 | 0 | 0 | 0 | ... | +10 | ... | +35 | ... | +45 | ... | +60 | +65 |
| | 2 | 0 | 0 | 0 | ... | +5 | ... | +30 | ... | +40 | ... | +55 | +60 |
| | ... | ... | ... | ... | ... | ... | ... | ... | ... | ... | ... | ... | ... |
| | 1024 | 0 | 0 | 0 | ... | 0 | ... | 0 | ... | 0 | ... | 0 | 0 |
| FIRST GRAYSCALE VALUE | ... | ... | ... | ... | ... | ... | ... | ... | ... | ... | ... | ... | ... |
| | 2048 | +30 | +28 | 0 | ... | 0 | ... | 0 | ... | 0 | ... | −38 | −40 |
| | ... | ... | ... | ... | ... | ... | ... | ... | ... | ... | ... | ... | ... |
| | 3072 | 0 | 0 | 0 | ... | 0 | ... | 0 | ... | 0 | ... | 0 | 0 |
| | ... | ... | ... | ... | ... | ... | ... | ... | ... | ... | ... | ... | ... |
| | 4094 | −45 | −40 | −40 | ... | −30 | ... | −25 | ... | −5 | ... | 0 | 0 |
| | 4095 | −50 | −45 | −45 | ... | −35 | ... | −30 | ... | −10 | ... | 0 | 0 |

R2

| 624 | | SECOND GRAYSCALE VALUE | | | | | | | | | R5 / R3 |
|---|---|---|---|---|---|---|---|---|---|---|---|
| | | 0 | 1 | 2 | ... | 1024 | ... | 2048 | ... | 3072 | ... | 4094 | 4095 |
| FIRST GRAYSCALE VALUE | 0 | 0 | 0 | 0 | ... | +432 | ... | +356 | ... | +296 | ... | +45 | +50 |
| | 1 | 0 | 0 | 0 | ... | +428 | ... | +352 | ... | +292 | ... | +40 | +45 |
| | 2 | 0 | 0 | 0 | ... | +424 | ... | +348 | ... | +288 | ... | +40 | +45 |
| | ... | ... | ... | ... | ... | ... | ... | ... | ... | ... | ... | ... | ... |
| | 1024 | −15 | −10 | −5 | ... | 0 | ... | +36 | ... | +56 | ... | +30 | +35 |
| | ... | ... | ... | ... | ... | ... | ... | ... | ... | ... | ... | ... | ... |
| | 2048 | −40 | −35 | −30 | ... | −148 | ... | 0 | ... | +28 | ... | +25 | +30 |
| | ... | ... | ... | ... | ... | ... | ... | ... | ... | ... | ... | ... | ... |
| | 3072 | −50 | −45 | −40 | ... | −216 | ... | −428 | ... | 0 | ... | +5 | +10 |
| | ... | ... | ... | ... | ... | ... | ... | ... | ... | ... | ... | ... | ... |
| | 4094 | −65 | −60 | −55 | ... | −216 | ... | −432 | ... | −548 | ... | 0 | 0 |
| | 4095 | −70 | −65 | −60 | ... | −216 | ... | −432 | ... | −552 | ... | 0 | 0 |

R6, R4

LIQUID-CRYSTAL DISPLAY APPARATUS AND METHOD FOR CORRECTING IMAGE SIGNAL

CROSS-REFERENCE TO RELATED APPLICATIONS

This application claims priority to and the benefit of priority of U.S. Provisional Application No. 62/808,012, filed on Feb. 20, 2019 the entire contents of which are incorporated herein by reference.

BACKGROUND

Technical Field

The present disclosure relates to a liquid-crystal display apparatus and a method for correcting image signal.

Description of Related Art

A liquid-crystal display panel provided in a liquid-crystal display apparatus comprises a plurality of scanning lines provided in respectively corresponding rows or columns of a plurality of pixels arranged in a matrix and a plurality of data lines provided in respectively corresponding pixels, each of which is aligned in a direction substantially orthogonal to the scanning lines. Each of the scanning lines is connected to the gate of each of a plurality of thin-film transistors (TFTs) aligned along each of the scanning lines. To each of the scanning lines is supplied a scanning line signal comprising a pulse (an on pulse) to turn on the TFT and being to successively select an individual scanning line and a pixel connected to the scanning line. On the other hand, to each data line is applied a data line signal having the electric potential corresponding to a transmittance of the pixel comprising the TFT to be turned on by the scanning line signal. Moreover, a pixel electrode connected to the TFT and a common electrode opposing thereto are provided, and a liquid crystal layer is provided between the pixel electrode and the common electrode. A certain electric potential is applied to the common electrode. In the pixel comprising the TFT being turned on, the electric potential of the data line signal is charged to the pixel electrode and the voltage is charged to the capacitance of the liquid crystal layer based on the electric potential of the pixel electrode and the electric potential of the common electrode. As the liquid crystal layer is driven by AC, a positive or negative voltage is applied to the liquid crystal layer depending on the pixel within the display surface, or, even in the same pixel, a positive or negative voltage is applied to the liquid crystal layer depending on the frame. Even when the voltage applied to the liquid crystal layer is positive or negative, the transmittance is the same as long as the absolute value thereof is the same, therefore, the absolute value of the electric potential of the pixel electrode or the data line relative to the common electrode will be respectively referred to as merely "the electric potential of the pixel electrode" or "the electric potential of the data line" in the explanations below. When the TFT is turned off, the voltage being applied to the liquid crystal layer at that time is held, and each pixel transmits light at the transmittance based on that voltage. Preferably, during the application period of the on pulse, the liquid crystal layer is charged until the electric potential of the pixel electrode of the liquid crystal layer is substantially the same as the electric potential of the data line signal, and a suitable image is displayed by the pixel having a desired transmittance.

With the liquid-crystal display apparatus, by increasing the number of pixels and the number of pictures to be displayed for each unit time (hereinafter, which is also simply referred to as "a flame rate"), it is possible to enhance the fineness of image and smoothness of video. However, with an increase in the number of pixels and/or the frame rate, the period (scan period) during which the TFT of each pixel can be turned on become shorter.

On the other hand, the plurality of data lines provided in the liquid-crystal display panel can have a certain electric resistance and wiring capacitance. Moreover, capacitative components of the liquid crystal layer and an auxiliary capacitance are also added to the data lines connected to the TFT to which the on pulse is input. Therefore, even when the electric potential of the data line signal input from one end of the data line changes, the electric potential of the pixel electrode of the pixel including the TFT connected to the data line reaches a desired electric potential after undergoing a certain period of time. Therefore, when the scan period shortens, it becomes difficult to charge the liquid crystal layer of each pixel to the state according to a desired transmittance during the shortened scan period. Moreover, when the timing of changeover of on/off of the TFT deviates from the timing of changeover of the electric potential of the data line, the charge state of the liquid crystal of each pixel can be affected by the electric potential to be applied to a pixel selected immediately after each pixel. The liquid crystal layer of each pixel not being charged to the desired state makes it likely for deterioration of display quality, such as deterioration of image definition, to occur.

SUMMARY

Thus, in the present disclosure, a novel liquid-crystal display apparatus is provided. The liquid-crystal display apparatus according to one embodiment of the present disclosure comprises a display panel comprising a plurality of pixels being arranged in a matrix, a plurality of scanning lines juxtaposed in a column direction and each connected to a plurality of pixels aligned in a row direction, and a plurality of data lines juxtaposed in the row direction and each connected to a plurality of pixels aligned in the column direction; a scanning line drive unit to successively output a scanning line signal to the plurality of scanning lines, wherein the scanning line signal selects a plurality of pixels being aligned in the row direction; a data line drive unit to output data line signals, to the plurality of data lines, for supplying voltages based on video data to the plurality of pixels being aligned in the row direction and selected by the scanning line signal; and an image signal correction unit to correct a grayscale value determined in accordance with a transmittance that the pixel is to have. The image signal correction unit is configured to determine a correction amount based on a first grayscale value determined in accordance with a transmittance that a first pixel in the plurality of pixels is to have and a second grayscale value determined in accordance with a transmittance that a second pixel in the plurality of pixels is to have, the second pixel being connected to the same data line as the first pixel and to be selected following the first pixel by the scanning line signal. The image signal correction unit carries out a first correction to bring the first grayscale value within a given range closer to the second grayscale value by a first correction amount determined based on a state of difference between the first grayscale value and the second grayscale value, the first correction being a correction for bringing a transmittance of the second pixel closer to a transmittance according to the second grayscale value.

According to another embodiment of the present disclosure, a method for correcting image signal input into a display panel is provided. The method for correcting image signal according to another embodiment of the present disclosure corrects a grayscale value determined in accordance with a transmittance that a pixel is to have, in a display panel comprising a plurality of pixels being arranged in a matrix; a plurality of scanning lines to be supplied with a scanning line signal, the plurality of scanning lines being juxtaposed in a column direction and each connected to a plurality of pixels aligned in a row direction; and a plurality of data lines juxtaposed in the row direction and each connected to a plurality of pixels aligned in the column direction. The method for correcting image signal comprises correcting the image signal based on a first grayscale value determined in accordance with a transmittance that a first pixel in the plurality of pixels is to have and a second grayscale value determined in accordance with a transmittance that a second pixel in the plurality of pixels is to have, the second pixel being connected to the same data line as the first pixel and to be selected following the first pixel by the scanning line signal supplied to the plurality of scanning lines. Correcting the image signal comprises carrying out a first correction to bring the first grayscale value within a given range closer to the second grayscale value by a first correction amount determined based on a state of difference between the first grayscale value and the second grayscale value, so as to bring a transmittance of the second pixel closer to a transmittance according to the second grayscale value.

The liquid-crystal display apparatus and the method for correcting image signal according to each of the above-described embodiments make it possible to bring the transmittance of a pixel closer to a desired transmittance and suppress deterioration of display quality of the liquid-crystal display apparatus.

BRIEF DESCRIPTION OF THE DRAWINGS

FIG. 6A shows one example of the configuration of the image signal correction unit according to one embodiment of the present disclosure.

FIG. 6B shows another example of the configuration of the image signal correction unit according to one embodiment of the present disclosure.

FIG. 11F shows yet another example of each correction carried out on the change in the grayscale value according to one embodiment of the present disclosure.

FIG. 13A shows one example of a first correction amount and a second correction amount being stored in the image signal correction unit according to one embodiment of the present disclosure.

DETAILED DESCRIPTION

Below, a liquid-crystal display apparatus and a method for correcting image signal according to the embodiments of the present disclosure will be described with reference to the drawings. The liquid-crystal display apparatus and the method for correcting image signal of the present disclosure are not to be construed to be limited to the description of the embodiments described below and each of the drawings referred to.

[Overall Structure of Liquid-Crystal Display Apparatus]

Figure 1:
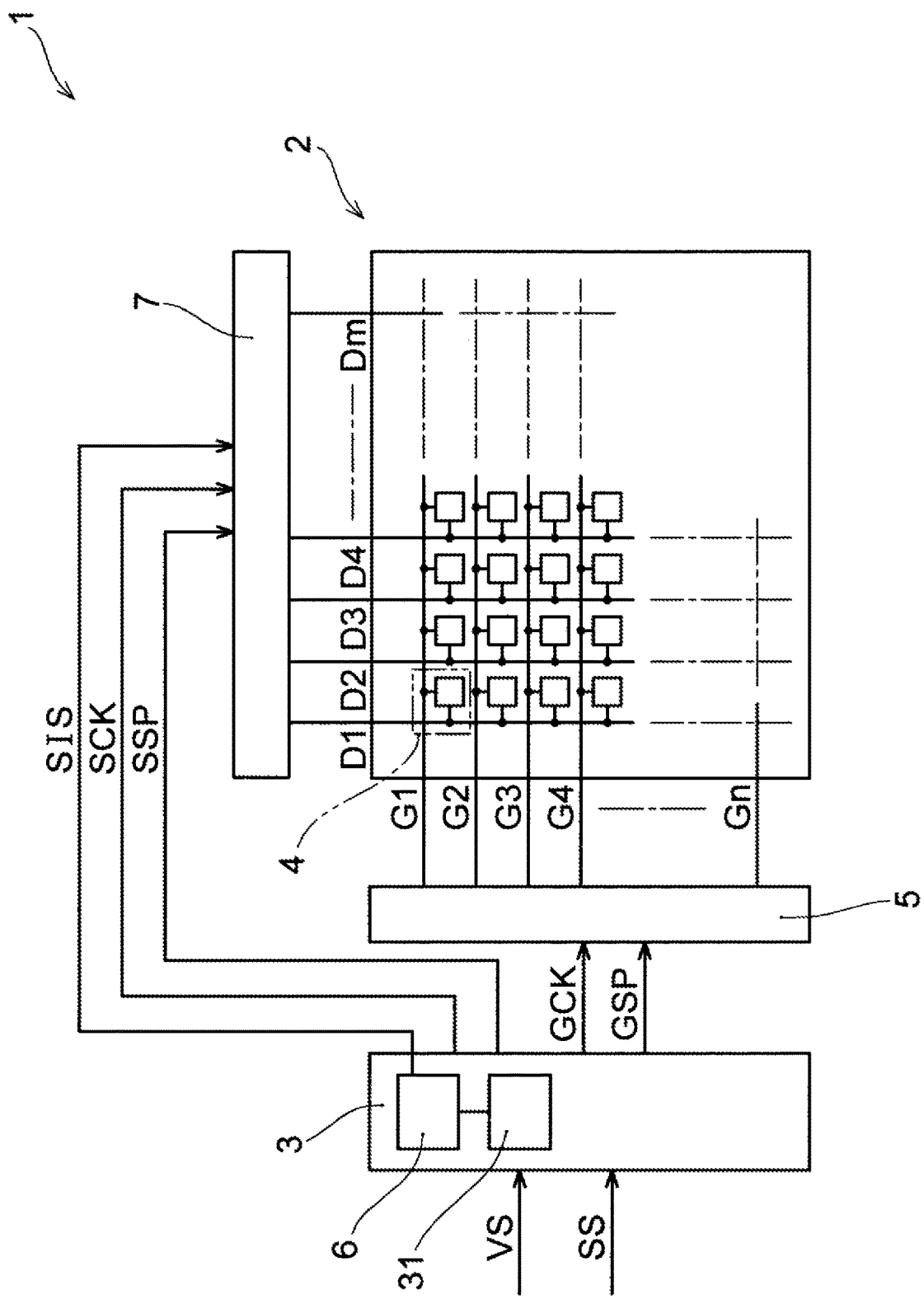
FIG. 1 schematically shows a liquid-crystal display apparatus according to one embodiment of the present disclosure.
Figure 2:
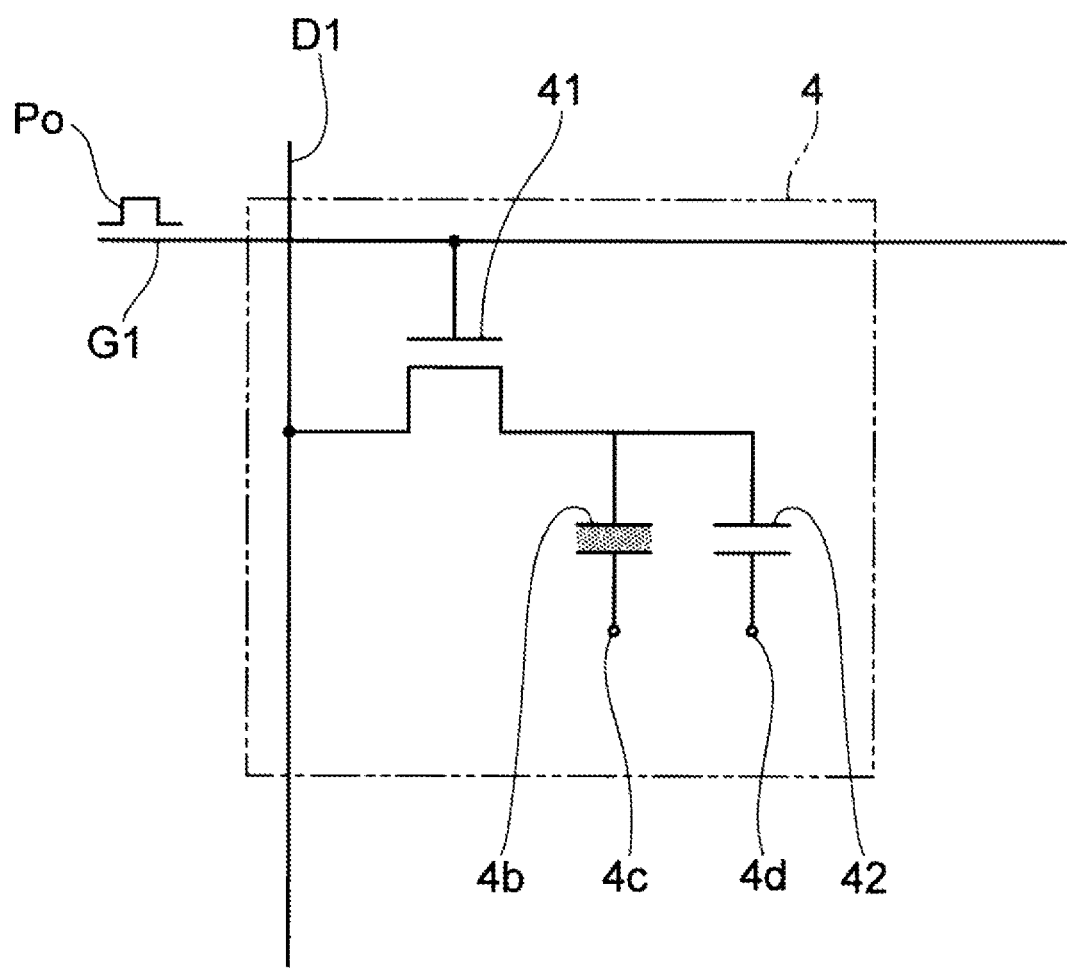
FIG. 2 shows one example of the electrical configuration of a pixel of the liquid-crystal display apparatus according to one embodiment of the present disclosure.

FIG. 1 schematically shows the configuration of a liquid-crystal display apparatus 1 according to Embodiment 1 of the present disclosure, while FIG. 2 shows the electrical configuration of a plurality of pixels 4 provided in the liquid-crystal display apparatus 1. As shown in FIG. 1, the liquid-crystal display apparatus 1 comprises a liquid-crystal display panel 2, a data line drive unit 7, a scanning line drive unit 5, and a timing control unit 3 to generate various signals to be supplied to the data line drive unit 7 and the scanning line drive unit 5. The liquid-crystal display panel 2 comprises the plurality of pixels 4 being arranged in a matrix, a plurality of scanning lines G1 to Gn juxtaposed in a column direction and each connected to a plurality of pixels 4 aligned in a row direction, and a plurality of data lines D1 to Dm juxtaposed in the row direction and each connected to a plurality of pixels aligned in the column direction. The plurality of data lines D1 to Dm are connected to the data line drive unit 7, and the plurality of scanning lines G1 to Gn are connected to the scanning line drive unit 5. The scanning line drive unit 5 successively outputs, to the plurality of scanning lines G1 to Gn, a scanning line signal to select the plurality of pixels 4, each of which is aligned in the row direction. The data line drive unit 7 outputs a data line signal, to the plurality of data lines D1 to Dm, for supplying a voltage based on video data to the plurality of pixels 4 being aligned in the row direction and selected by the scanning line signal. The video data is data on video to be displayed by the liquid-crystal display panel 2 and comprises a grayscale value determined in accordance with a transmittance that each of the plurality of pixels 4 is to have. Then, the liquid-crystal display apparatus 1 comprises an image signal correction unit 6 to correct the grayscale value determined in accordance with the transmittance that the pixel is to have. In the example in FIG. 1, the image signal correction unit 6 is provided in the timing control unit 3.

The timing control unit 3 is configured with main components such as an application-specific integrated circuit (ASIC) or a dedicated IC, and peripheral components thereof, for example. The timing control unit 3 generates an image signal SIS, and various control signals such as a scanning line clock GCK, a scan start pulse GSP, a data start pulse SSP, and a data line clock SCK based on a video signal VS comprising video data, and a synchronization signal SS. In the example in FIG. 1, the timing control unit 3 comprises an image signal generation unit 31 to carry out a gamma conversion, an overdrive conversion, and a dithering conversion to generate the image signal SIS. The image signal SIS comprises a plurality of pixel data indicating a grayscale value according to the transmittance that each of the plurality of pixels 4 is to have. The generated image signal SIS is supplied to the data line drive unit 7. The transmittance of each of the plurality of pixels 4 corresponds to the luminance of each pixel when combined with a light source (not shown) of the liquid-crystal display apparatus 1. Thus, in the explanations below, "the transmittance" of the pixel 4 is also referred to as "the luminance".

The data line drive unit 7 determines an electric potential to be applied to each one of the plurality of data lines D1 to Dm based on the image signal SIS at the timing according to the data start pulse SSP and the data line clock SCK and generates the data line signal comprising the electric potential at a proper timing. The data line signal generated comprises information on the grayscale value according to the luminance each of the plurality of pixels 4 is to have. The data line drive unit 7 is embodied by a semiconductor integrated circuit device such as a source driver IC, for example.

The scanning line drive unit 5 outputs a scanning line signal to the plurality of scanning lines G1 to Gn based on the scanning clock signal GCK, the scan start pulse GSP, and the like, the scanning line signal comprising an on pulse Po (see FIG. 2) to successively select any one of the plurality of scanning lines G1 to Gn. The on pulse Po can be applied to only one scanning line in one scan period, or can be applied to a plural number of scanning lines simultaneously. For example, each one of the plurality of scanning lines G1 to Gn can be selected continuously over two or more scan periods (an overlapped drive). The scanning line drive unit 5 is embodied by a semiconductor integrated circuit device such as a gate driver IC, for example.

"One scan period" in the present disclosure is a minimum unit for a period in which each one of the plurality of scanning lines G1 to Gn is selected, while "i-th scan period" (i=1 to n) is one arbitrary scan period within a one frame period. Unless otherwise specified, the "one scan period" corresponds to a period of the scanning line clock GCK. Moreover, in a case that the previously-described "overlapped drive" is not used, the "one scan period" corresponds to the length of period over which each one of the plurality of scanning lines G1 to Gn is to be selected.

Each one of the plurality of pixels 4 of the liquid-crystal display panel 2 comprises a TFT 41 and an auxiliary capacitance 42 as shown in FIG. 2. The gate of the TFT 41 is connected to the scanning line (the scanning line G1 in FIG. 2). One of the source and the drain of the TFT 41 is connected to the data line (the data line D1 in FIG. 2), while the other thereof is connected to the auxiliary capacitance 42 as well as being connected to a liquid crystal layer 4b. The liquid crystal layer 4b is sandwiched between a counter electrode common to all pixels and a pixel electrode (not shown) specific to each pixel 4, with the pixel electrode being connected to the TFT 41 of each pixel 4 and the counter electrode being connected to a common electrode 4c, respectively. The electrode opposite to the TFT 41 in the auxiliary capacitance 42 is connected to a capacitance electrode 4d.

When the on pulse Po is applied to the scanning line G1, the liquid crystal layer 4b and the auxiliary capacitance 42 are charged based on the electric potential of the data line D1, and, at the time of completion of the on pulse Po, the voltage being applied to the liquid crystal layer 4b is generally sustained by the liquid crystal layer 4b and the auxiliary capacitance 42. As a result, the liquid crystal layer 4b of each pixel 4 transmits light at the transmittance based on the electric potential of the data line D1 and a desired image is displayed. However, when the period of the on pulse shortens as described previously, it becomes difficult to charge the liquid crystal layer 4b until the electric potential of the pixel electrode reaches an electric potential set on the data line D1. The resulting deterioration of display quality will be described in detail with reference to FIGS. 3, and 4A to 4B.

Figure 3:
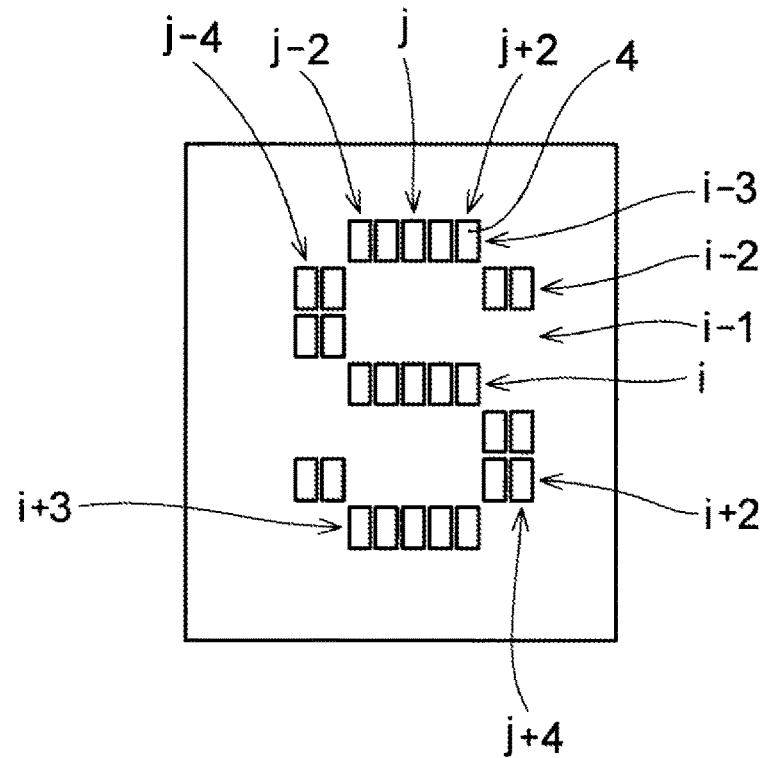
FIG. 3 shows one example of an image displayed by the liquid-crystal display apparatus according to one embodiment of the present disclosure.

FIG. 3 shows an image of a letter "S" as one example of an image desired for displaying onto the liquid-crystal display panel 2. While the background is shown with no color in FIG. 3 (and FIG. 4B), it is intended that black (0 grayscale) be displayed in the background of the letter "S" and the letter "S" be displayed with intermediate grayscale (for example, 2048 grayscale in the entire 4096 grayscales). Moreover, in FIGS. 3 and 4B, individual rectangles configuring the letter "S" show one pixel (or one sub-pixel). The letter "S" is displayed with pixels of row (i−3) to row (i+3) and column (j−4) to column (j+4).

Figure 4A:
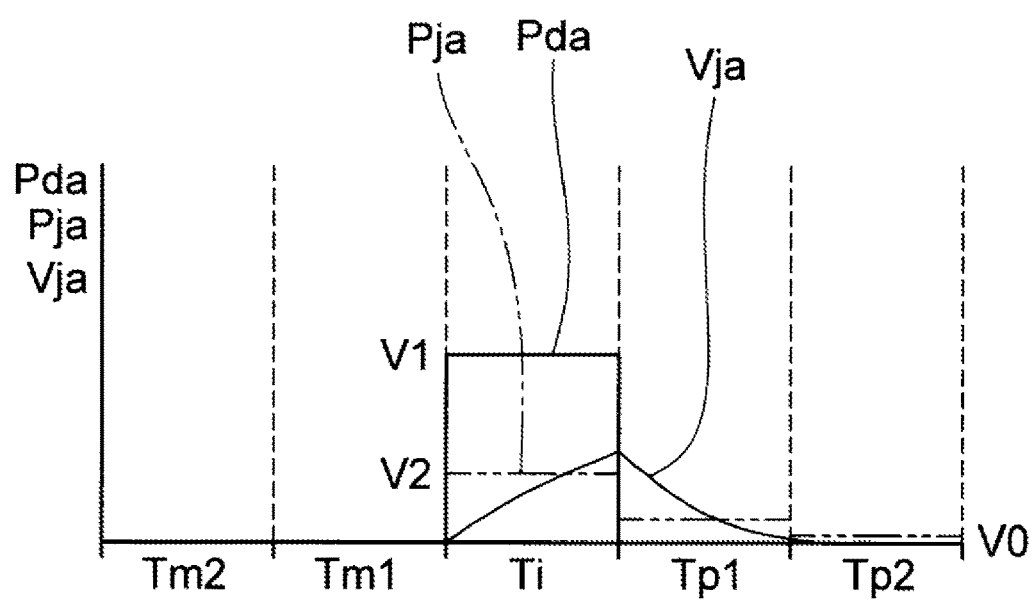
FIG. 4A shows one example of pixel data, electric potential change on the data line, and pixel data equivalent to that electric potential change, in a case that a correction by the image signal correction unit is not carried out.

In FIG. 4A, a series of pixel data Pda to be applied to the column j data line from an (i−2)-th scan period Tm2 to an (i+2)-th scan period Tp2 to display the letter "S" shown in FIG. 3 is shown with respect to each of the corresponding scan periods shown on the horizontal axis. Each pixel data in FIG. 4A (and FIGS. 7A, 7B, and 10A to 10C to be referred to later) shows a grayscale value indicated by each pixel data. In FIG. 4A are further shown the electric potential Vja of the column j data line when the series of pixel data Pda is applied and virtual pixel data Pja (in a chain double dashed line) equivalent to the gradually changing electric potential Vja. The (i−2)-th scan period is a scan period over which the row (i−2) scanning line is selected. The notations for the other scan periods are also used to the same effect. Moreover, each scan period from the (i−2)-th scan period Tm2 to the (i+2)-th scan period Tp2 is also merely referred to as "scan period Tm2", "scan period Tm1", "scan period Ti", "scan period Tp1", and "scan period Tp2".

The data line drive unit 7 generates a data line signal based on an image signal SIS comprising the series of pixel data Pda shown in FIG. 4A and applies the generated data line signal to the column j data line. However, as described previously, each data line of the liquid-crystal display panel 2 has a capacitive component, so that the electric potential Vja of the column j data line gradually changes as shown in FIG. 4A. For example, in a case that the number of pixels of the liquid-crystal display panel 2 is large and/or the frame rate is high (for example, the number of pixels: 7680×4320, the frame rate: 120 frames/sec), the scan period Ti can end during the change of the electric potential Vja of the data line as in FIG. 4A. In this case, the pixel 4 of (row i, column j) is to have the luminance equivalent to the luminance in a case that the virtual pixel data Pja is applied to the column j data line, so that the pixel to have the luminance corresponding to a grayscale value V1 can only have the luminance corresponding to a grayscale value V2. As a result, as shown in FIG. 4B, the pixels 4 of column (j−2) to column (j+2) of row i, for example, to have the luminance according to 2048 grayscale per se ends up having the luminance lower than the luminance according to 2048 grayscale, causing the display quality to deteriorate.

Figure 4B:
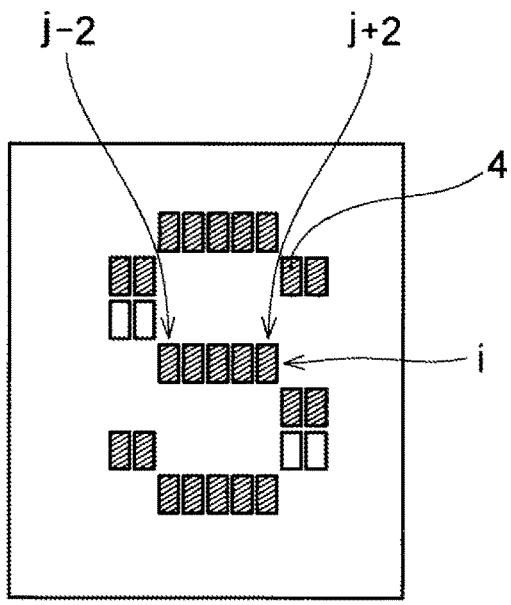
FIG. 4B shows one example of a display image according to the example in FIG. 4A.

To suppress the deterioration of display quality as shown in FIGS. 4A and 4B, a correction to adjust the output timing of the scanning line signal, also referred to as τg correction, and/or a correction to adjust the output timing of the data line signal, also referred to as τs correction can be considered. However, these corrections complicate the timing control unit 3, the scanning line drive unit 5, and/or the data line drive unit 7.

On the contrary, in the liquid-crystal display apparatus 1 according to the present embodiment, the image signal correction unit 6 (see FIG. 1) is provided. The image signal correction unit 6 corrects a grayscale value determined according to the transmittance each of the plurality of pixels 4 is to have and included as each pixel data in the image signal SIS.

[Explanations on First to Fourth Corrections]

The image signal correction unit 6 corrects at least one of a first grayscale value and a second grayscale value by a correction amount being based on the state of difference between the first grayscale value and the second grayscale value, the first grayscale value being determined in accordance with the transmittance a first pixel is to have and the second grayscale value being determined in accordance with the transmittance a second pixel is to have. Here, the first pixel is one arbitrary pixel of the plurality of pixels 4. The second pixel is a pixel being connected to the same data line D1 to Dm as the first pixel and selected following the first pixel.

For example, the first pixel is a pixel of (row (i−1), column j) being connected to the column j data line in the example in FIG. 3, and, in a case that a pixel aligned in the column direction is successively selected from row (i−3) toward row (i+2), the second pixel is the pixel of (row i, column j). While the first pixel and the second pixel are consecutively selected pixels, it does not necessarily mean two pixels being adjacently arranged in the column direction. The positional relationship between the first pixel and the second pixel can change depending on the arrangement scheme and the scanning scheme of the plurality of pixels 4 in the liquid-crystal display panel 2. For example, two adjacent pixels in the row direction and two pixels arranged in an obliquely adjacent manner can also be the first pixel and the second pixel. Moreover, a pixel being the second pixel in relation to certain two pixels can be, in relation to a pixel selected following that pixel, the first pixel.

The image signal correction unit 6 can extract the first grayscale value and the second grayscale value, the first grayscale value being determined in accordance with the transmittance the first pixel is to have and the second grayscale value being determined in accordance with the transmittance the second pixel is to have, and carry out one or a plurality of types of corrections based on the state of difference between these two grayscale values. Four corrections (first to fourth corrections) the image signal correction unit 6 can carry out are explained with reference in FIGS. 5A to 5D.

Figure 5A:
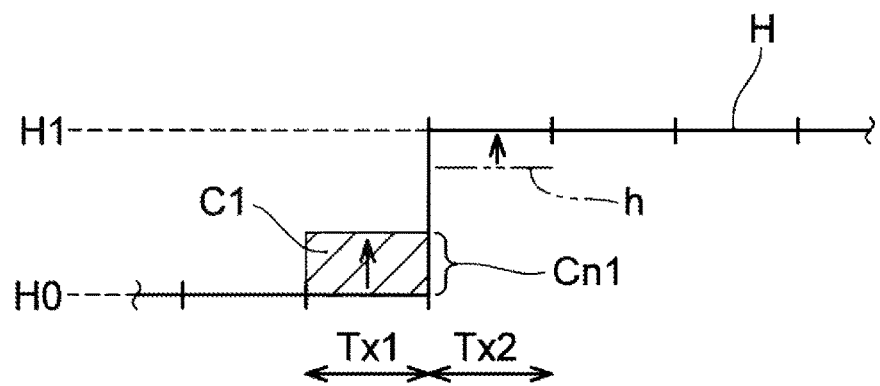
FIG. 5A schematically shows the concept of a first correction by the image signal correction unit.
Figure 5B:
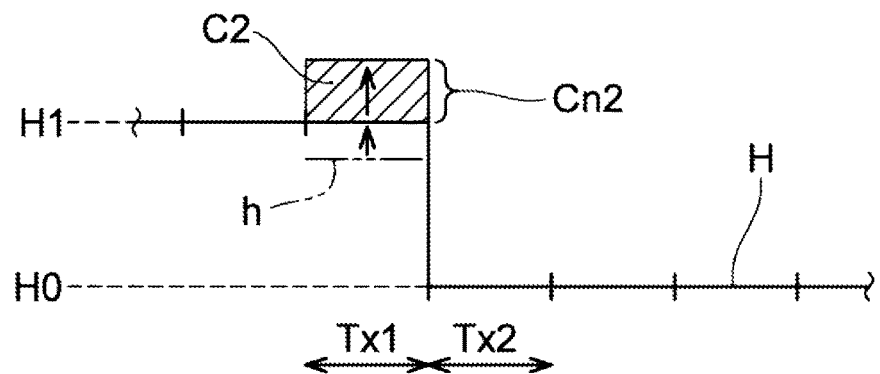
FIG. 5B schematically shows the concept of a second correction by the image signal correction unit.
Figure 5C:
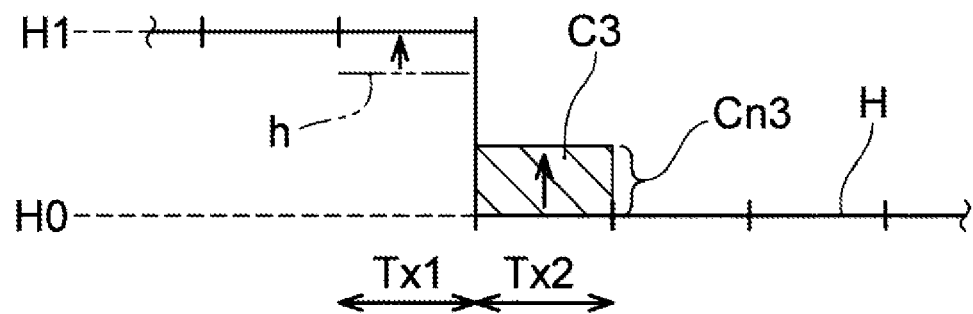
FIG. 5C schematically shows the concept of a third correction by the image signal correction unit.
Figure 5D:
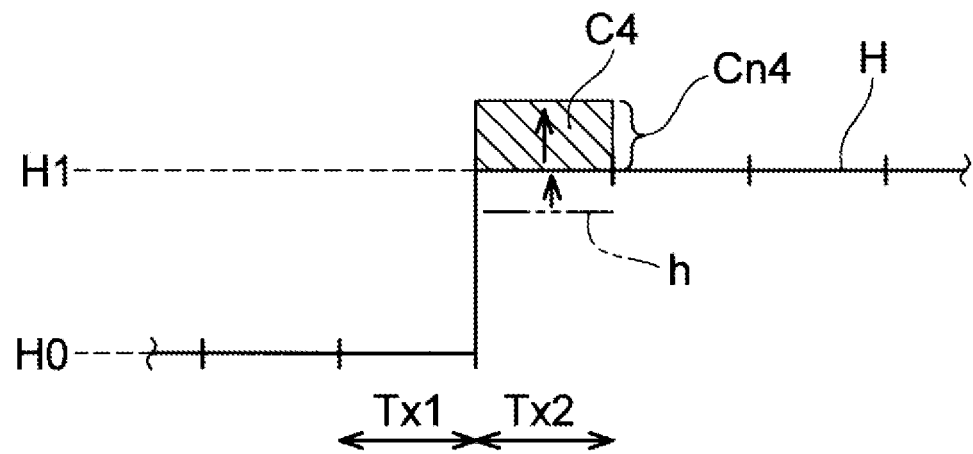
FIG. 5D schematically shows the concept of a fourth correction by the image signal correction unit.

FIG. 5A shows a first correction C1, FIG. 5B shows a second correction C2, FIG. 5C shows a third correction C3, and FIG. 5D shows a fourth correction C4 conceptually, respectively. The horizontal axis in FIGS. 5A to 5D shows a series of scan periods, and a grayscale value H is shown which is determined in accordance with the transmittance the pixel 4 selected in each scan period is to have. In FIGS. 5A to 5D, the lower grayscale value (a grayscale value H0) of the grayscale value H shows 0 grayscale, while the higher grayscale value (a grayscale value H1) of the grayscale value H shows 2048 grayscale being intermediate grayscale in the entire 4096 grayscales, for example. In FIGS. 5A to 5D, a scan period Tx1 is a selection period of the first pixel in each of the first correction C1 to the fourth correction C4 and then a scan period Tx2 is a selection period of the second pixel in each of the first correction C1 to the fourth correction C4. Then, a chain double dashed line h shown in the scan period Tx1 or the scan period Tx2 shows a grayscale value according to the transmittance the first pixel or the second pixel is to have in a case that the first to fourth correction is not carried out. The arrow above the chain double dashed line h shows the direction of change (effect) caused by each correction on the grayscale value shown with the chain double dashed line h.

The image signal correction unit 6 carries out the first correction C1 shown in FIG. 5A. As shown in FIG. 5A, the first correction C1 is a correction to bring the transmittance of the second pixel selected in the scan period Tx2 closer to the transmittance according to the second grayscale value (the grayscale value H1 being intermediate grayscale in FIG. 5A). In this first correction C1, the first grayscale value (the grayscale value H0 being 0 grayscale in FIG. 5A) within a given range is brought closer to the second grayscale value by a first correction amount Cn1. In the first correction C1, the above-described given range, or, in other words, the range of the first grayscale value is the range of low grayscale or high grayscale, for example. For example, in a case of the entire 4096 grayscales, the range of the first grayscale value in the first correction C1 can be an arbitrary range within the range less than 1024 grayscale or greater than 3072 grayscale. The first correction amount Cn1 (and below-described second correction amount Cn2 to fourth correction amount Cn4) will be determined based on the state of difference between the first grayscale value and the second grayscale value. The method of determining the first correction amount Cn1 to the fourth correction amount Cn4 will be described later.

In the transition period from the scan period Tx1 to the scan period Tx2, the electric potential of the data line to which both the first pixel and the second pixel are connected changes (rises) with the change in the grayscale value H shown in FIG. 5A. As previously described with reference to FIGS. 4A and 4B, the electric potential of the data line cannot rise sufficiently in the scan period Tx2, as a result, the second pixel may only have the transmittance according to the grayscale value shown with the chain double dashed line h in FIG. 5A. However, the first correction C1 being carried out causes the electric potential of the data line in the scan period Tx1 to be brought closer to the electric potential in the scan period Tx2. Thus, in the scan period Tx2, this data line can reach up to the electric potential being higher relative to a case of no correction as shown in FIG. 4A. As a result, as shown in FIG. 5A, a grayscale value according to the transmittance that the second pixel may have can rise above the grayscale value shown with the chain double dashed line h and can be brought closer to the second grayscale value (the grayscale value H1 in FIG. 5A) according to the transmittance the second pixel ought to have.

The image signal correction unit 6 can carry out the second correction C2 shown in FIG. 5B. As shown in FIG. 5B, the second correction C2 is a correction to bring the transmittance of the first pixel selected in the scan period Tx1 closer to the transmittance according to the first grayscale value (the grayscale value H1 being intermediate grayscale in FIG. 5B). In the second correction C2, the first grayscale value within a given range is brought farther away from the second grayscale value (the grayscale value H0 in FIG. 5B) by the second correction amount Cn2. In the second correction C2, the above-described given range, or, in other words, the range of the first grayscale value can be the range of intermediate grayscale, or the range of low grayscale or high grayscale. Advantages of carrying out the second correction C2 will be described below.

Generally, in the liquid-crystal display panel, the data line signal may start changing to the electric potential according to the following scan period previous to changeover of on/off of TFT of each pixel due to delay of the scanning line signal. In such a case, in the example in FIG. 5B, the electric potential of the data line in the scan period Tx2 ends up being applied to the first pixel selected in the scan period Tx1. As a result, the electric potential of the pixel electrode of the first pixel ends up changing toward the electric potential according to the second grayscale value (the grayscale value H0 in FIG. 5B) from the electric potential according to the first grayscale value (the grayscale value H1 in FIG. 5B), so that the first pixel can only have the transmittance according to the grayscale value shown with the chain double dashed line h in FIG. 5B.

The image signal correction unit 6 carries out the second correction C2 such that the first pixel can have the transmittance according to the first grayscale even in such a case. As shown in FIG. 5B, the second correction C2 being carried out makes it possible for the grayscale value according to the transmittance that the first pixel may have to rise above the grayscale value shown with the chain double dashed line h and to be brought closer to the first grayscale value (which is the first grayscale value before the correction and is the grayscale value H1 in FIG. 5B) according to the transmittance the first pixel ought to have.

The image signal correction unit 6 can carry out the third correction C3 shown in FIG. 5C. The third correction C3, as shown in FIG. 5C, is a correction to bring the transmittance of the first pixel selected in the scan period Tx1 closer to the transmittance according to the first grayscale value (the grayscale value H1 being intermediate grayscale in FIG. 5C). In the third correction C3, the second grayscale value within a given range (the grayscale value H0 in FIG. 5C) is brought closer to the first grayscale value by the third correction amount Cn3. In the third correction C3, the above-described given range, or, in other words, the range of the second grayscale value is the range of low grayscale or high grayscale, for example. In a case of the entire 4096 grayscales, for example, the range of the second grayscale value in the third correction C3 can be an arbitrary range within a range less than 1024 grayscale or greater than 3072 grayscale.

The third correction C3, in the same manner as the second correction C2, is also carried out primarily with an aim to decrease the effect received by the first pixel by change of the electric potential of the data line signal before the TFT of the first pixel is turned off. However, unlike the second correction C2, the second grayscale value is brought closer to the first grayscale value. As a result, as shown in FIG. 5C, a grayscale value according to the transmittance that the first pixel may have can rise above the grayscale value shown with the chain double dashed line h and can be brought closer to the first grayscale value (the grayscale value H1 in FIG. 5C) according to the transmittance the first pixel ought to have.

The image signal correction unit 6 can carry out the fourth correction C4 shown in FIG. 5D. As shown in FIG. 5D, the fourth correction C4 is a correction to bring the transmittance of the second pixel selected in the scan period Tx2 closer to the transmittance according to the second grayscale (the grayscale value H1 being intermediate grayscale in FIG. 5D). In the fourth correction C4, the second grayscale value within a given range is brought farther away from the first grayscale value (the grayscale value H0 in FIG. 5D) by the fourth correction amount Cn4. In the fourth correction C4, the above-described given range, or, in other words, the range of the second grayscale value can be the range of intermediate grayscale, or the range of low grayscale or high grayscale.

As described in the explanations on the first correction C1, in the scan period Tx2, the electric potential of the data line does not possibly rise sufficiently, so that, as a result, the second pixel can have only the transmittance according to the grayscale value shown with the chain double dashed line h in FIG. 5D. In virtue of the fourth correction C4 being carried out, a grayscale value according to the transmittance that the second pixel may have can rise above the grayscale value shown with the chain double dashed line h and can be brought closer to the second grayscale value (which is the second grayscale value before the correction and is the grayscale value H1 in the example in FIG. 5D) according to the transmittance the second pixel ought to have.

In FIGS. 5A to 5D, for each of the first correction C1 to the fourth correction C4, examples are shown of a correction (a correction in the positive direction) to raise or increase the grayscale value to be corrected (the first grayscale value or the second grayscale value). However, as it can be understood, a correction to lower or decrease the grayscale value to be corrected (a correction in the negative direction) can be carried out in each of the corrections. For example, in a case that the second grayscale value is less than the first grayscale value in the first correction C1, the correction in the negative direction is carried out on the first grayscale value.

In this way, the image signal correction unit 6 carries out at least one of the first correction C1 to the fourth correction C4. For example, all of the first correction C1 to the fourth correction C4 can be carried out, or a part thereof does not have to be carried out. As described previously, a pixel being the first pixel in any of the first correction C1 to the fourth correction C4 with respect to a certain pixel can be the second pixel with respect to a different pixel. Moreover, in the liquid-crystal display panel 2, in each of the two pixels being selected consecutively, the same correction of the first correction C1 to the fourth correction C4 can be carried out, or mutually different corrections thereof can be carried out. Thus, for example, each one of the plurality of pixels 4 can be the first pixel in the first correction C1 or the second correction C2 with respect to a pixel selected subsequently and the second pixel in the third correction C3 or the fourth correction C4 with respect to a pixel selected previously. In other words, the first grayscale value in the first correction C1 or the second correction C2 can be the second grayscale value in the third correction C3 or the fourth correction C4. Then, each grayscale value applied to each one of the plurality of pixels 4 can be corrected by both the first correction C1 or the second correction C2 and the third correction C3 or the fourth correction C4.

In the first correction C1 of the first correction C1 to the fourth correction C4, the grayscale value to be applied to the first pixel (the grayscale value after correction) is offset from the first grayscale value determined in accordance with the transmittance the first pixel is to have in order to bring the transmittance of the second pixel closer to a desired transmittance. Moreover, in the third correction C3, the grayscale value to be applied to the second pixel (the grayscale value after correction) is offset from the second grayscale value determined in accordance with the transmittance the second pixel is to have in order to bring the transmittance of the first pixel closer to a desired transmittance. In other words, in the first correction C1, a grayscale value differing a little from the grayscale value according to the transmittance the first pixel is to have is applied to the first pixel, and, in the third correction C3, a grayscale value differing a little from the grayscale value according to the transmittance the second pixel is to have is applied to the second pixel. However, as described later, in a case that the first correction C1 and the third correction C3 are carried out in a certain grayscale range, there is little substantial effect by each correction on displaying in each of the first pixel in the first correction C1 and the second pixel in the third correction C3.

[Structure of Image Signal Correction Unit]

FIG. 6A shows one example of the configuration of the image signal correction unit 6. The image signal correction unit 6 exemplified in FIG. 6A comprises a first correction circuit (first correction unit) 61 that can carry out the first correction C1 and the second correction C2. To the first correction circuit 61, an image signal including pixel data indicating the first grayscale value and the second grayscale value to be corrected in the first correction C1 or the second correction C2 is input. In the explanation of the configuration of the image signal correction unit 6, the image signal, together with a synchronization signal, is referred to as an image signal and synchronization signal IS. The first correction circuit 61 corrects a first grayscale value Pd1 of grayscale values included in the image signal and synchronization signal IS. The first grayscale value Pd1 is included in the pixel data (the first pixel data) to be applied to any one specific data line (below, this specific data line is also referred to as a data line Dx) of the plurality of data lines D1 to Dm (see FIG. 1) in one scan period (a first scan period). The first correction circuit 61 is configured to correct the first grayscale value Pd1 based on the state of difference between the first grayscale value Pd1 and a second grayscale value Pd2 included in the image signal and synchronization signal IS. Here, the second grayscale value Pd2 is included in the pixel data (the second pixel data) to be applied to the data line Dx in a scan period (a second scan period) following the first scan period.

[First Correction Circuit]

The first correction circuit 61 exemplified in FIG. 6A comprises a first delay unit 611, a first determination unit 612 to determine the first correction amount Cn1 or the second correction amount Cn2 on the first grayscale value Pd1, and a first addition unit 613 to combine the output of the first delay unit 611 and the first correction amount Cn1 or the second correction amount Cn2. The first delay unit 611 is configured by a memory element such as a line memory, for example. To the first delay unit 611, the image signal and synchronization signal IS including the first grayscale value Pd1 and the second grayscale value Pd2 is input. The first delay unit 611 delays the image signal and synchronization signal IS by a time corresponding to one scan period of the liquid-crystal display panel 2 (see FIG. 1). More specifically, the first delay unit 611 stores therein pixel data corresponding to at least one scan period (pixel data to be applied to each of the data lines D1 to Dm (see FIG. 1) in one scan period), and, for each scan period, outputs a first image signal and synchronization signal Id1 including the stored pixel data corresponding to one scan period. In the scan period in which the first grayscale value Pd1 is included in the first image signal and synchronization signal Id1, a second image signal and synchronization signal Id2 received by the image signal correction unit 6 subsequently to the first image signal and synchronization signal Id1 includes the second grayscale value Pd2.

The first determination unit 612 extracts the second grayscale value Pd2 included in the second image signal and synchronization signal Id2 and the first grayscale value Pd1 included in the first image signal and synchronization signal Id1 delayed by the first delay unit 611. The first determination unit 612 determines the first correction amount Cn1 or the second correction amount Cn2 based on the state of difference between the first grayscale value Pd1 and the second grayscale value Pd2. In the example in FIG. 6A, the first determination unit 612 comprises a look up table (LUT) 614. This LUT 614 can be referred to as a two-dimensional LUT as it has the first grayscale value Pd1 and the second grayscale value Pd2 as two inputs. The LUT 614, for example, stores therein correction amounts each set on each of combinations of each of grayscale values from a minimum value to a maximum value the first grayscale value Pd1 can take and each of grayscale values from a minimum value to a maximum value the second grayscale value Pd2 can take. The first determination unit 612 can determine the first correction amount Cn1 or the second correction amount Cn2 based on the state of difference between the first grayscale value Pd1 and the second grayscale value Pd2 with reference to the LUT 614.

The LUT 614 does not have to store therein the correction amounts on all combinations between grayscale values the first and second grayscale values can take. For example, the LUT 614 can store therein only the correction amount on combinations between grayscale values of the power of 2. In that case, the correction amounts on combinations including grayscale values not being stored can be determined by a given operation, for example, a linear interpolation operation, in the first determination unit 612.

The first correction circuit 61, in a case that the second grayscale value Pd2 is greater (less) than the first grayscale value Pd1 in the first correction, for example, carries out the first correction such that the first grayscale value Pd1 increase (decreases). Moreover, in a case of no difference of greater than or equal to a given magnitude between the first grayscale value Pd1 and the second grayscale value Pd2, the first grayscale value Pd1 does not have to be corrected. For example, the LUT 614 can store therein a positive/negative correction amount causing such a correction operation.

The first addition unit 613 combines the first correction amount Cn1 or the second correction amount Cn2 with the first image signal and synchronization signal Id1. For example, the first addition unit 613 adds the first correction amount Cn1 and the first grayscale value Pd1 extracted from the first image signal and synchronization signal Id1. The first correction amount Cn1 and the second correction amount Cn2 can also have negative values. Thus, the first addition unit 613 can subtract the absolute value of the first correction amount Cn1 or the second correction amount Cn2 from the first grayscale value Pd1. The first addition unit 613 outputs a corrected image signal IS1 being an image signal combined with the first correction amount Cn1 or the second correction amount Cn2.

Either of the first correction and the second correction can be carried out by the first correction circuit 61. In accordance with a change in the grayscale value determined in accordance with the transmittance that each of two arbitrary pixels consecutively selected is to have, either of the first correction and the second correction can be carried out or neither of them is possibly carried out.

FIG. 6B shows another example of the configuration of the image signal correction unit 6. In addition to the first correction circuit 61, the image signal correction unit 6 in the example in FIG. 6B comprises a second correction circuit 62 that can carry out the third correction C3 (see FIG. 5C) or the fourth correction (see FIG. 5D). In the example in FIG. 6B, the first correction circuit 61 outputs the first image signal and synchronization signal Id1 to the second correction circuit 62. The first correction circuit 61 being shown in FIG. 6B except for this point is equivalent to the first correction circuit 61 shown in FIG. 6A, so that explanations thereof will be omitted.

[Second Correction Circuit]

The second correction circuit 62 corrects the second grayscale value Pd4 in the third or fourth correction based on the state of difference between the first grayscale value Pd3 in the third or fourth correction and the second grayscale value Pd4 in the third or fourth correction. In the example in FIG. 6B, the second grayscale value Pd4 in the third or fourth correction is the first grayscale value Pd1 in the first or second correction and included in the first image signal and synchronization signal Id1. The grayscale value Pd3 in the third or fourth correction is indicated by the third pixel data included in the image signal and synchronization signal IS. Here, the third pixel data is pixel data to be applied to the data line Dx in a scan period (third scan period) preceding by one scan period relative to the previously-described first scan period.

The second correction circuit 62 exemplified in FIG. 6B comprises a second delay unit 621 to further delay an image signal delayed by the first delay unit 611; and a second determination unit 622 to determine the third correction amount Cn3 or the fourth correction amount Cn4. The second correction circuit 62 further comprises a second addition unit 623 to combine the third correction amount Cn3 or the fourth correction amount Cn4 with the corrected image signal IS1 output from the first correction circuit 61. The second delay unit 621 is configured by a memory element such as a line memory, for example, in the same manner as the first delay unit 611. The second delay unit 621 further delays the first image signal and synchronization signal Id1 by a time corresponding to one scan period of the liquid-crystal display panel 2. Thus, in the scan period in which the second grayscale value Pd4 in the third or fourth correction is included in the first image signal and synchronization signal Id1, the first grayscale value Pd3 in the third or fourth correction is included in the image signal (the third image signal) being delayed by the second delay unit 621. The third image signal is an image signal received by the image signal correction unit 6 one previous to the first image signal. "The first grayscale value Pd3 in the third or fourth correction" is also merely referred to as "the first grayscale value Pd3" and "the second grayscale value Pd4 in the third or fourth correction" is also merely referred to as "the second grayscale value Pd4".

The second determination unit 622 extracts the first grayscale value Pd3 included in a third image signal and synchronization signal Id3 and also extracts the second grayscale value Pd4 included in the first image signal and synchronization signal Id1. Then, the second determination unit 622 determines the third correction amount Cn3 or the fourth correction amount Cn4 based on the state of difference between this first grayscale value Pd3 and the second grayscale value Pd4.

In the example in FIG. 6B, the second determination unit 622 comprises a look up table (LUT) 624. This LUT 624 can be referred to as a two-dimensional LUT as it has the first grayscale value Pd3 and the second grayscale value Pd4 as two inputs. The LUT 624 can have the same storage structure as the LUT 614 of the first correction circuit 61. The LUT 624 can store therein correction amounts each set on each of combinations of each grayscale value the first grayscale value Pd3 can take and each grayscale value the second grayscale value Pd4 can take. The second determination unit 622 can determine the third correction amount Cn3 or the fourth correction amount Cn4 based on the state of difference between the first grayscale value Pd3 and the second grayscale value Pd4 with reference to the LUT 624. In a similar manner to the LUT 614, the LUT 624 can store therein a correction amount on each of combinations between each grayscale value such as 0 to 4095, for example. Moreover, the LUT 624 can store therein only the correction amount on combinations between grayscale values of the power of 2, while the correction amount on the other combinations can also be determined by a given operation, for example, a linear interpolation operation, in the second determination unit 622.

The second correction circuit 62, in a case that the grayscale value being the second grayscale value Pd4 is greater (less) than the first grayscale value Pd3 in the fourth correction, for example, carries out the fourth correction such that the second grayscale value Pd4 increases (decreases). Moreover, in a case of no difference of greater than or equal to a given magnitude between the first grayscale value Pd3 and the second grayscale value Pd4, the second grayscale value Pd4 does not have to be corrected. For example, the LUT 624 can store therein a positive/negative correction amount causing such a correction operation.

The second addition unit 623 combines the third correction amount Cn3 or the fourth correction amount Cn4 with the corrected image signal IS1 output from the first correction circuit 61. For example, the second addition unit 623 adds a first grayscale value Pd1a after correction by the first correction circuit 61 which is extracted from the corrected image signal IS1 and the third correction amount Cn3 or the fourth correction amount Cn4. The third correction amount Cn3 and the fourth correction amount Cn4 can also have negative values. Thus, the second addition unit 623 can subtract the absolute value of the third correction amount Cn3 or the fourth correction amount Cn4 from the corrected first grayscale value Pd1a. The second addition unit 623 outputs an image signal IS2 being corrected by both the first or second correction and the third or fourth correction. By the second addition unit 623 combining the third correction amount Cn3 or the fourth correction amount Cn4, and the image signal IS1 being corrected by the first correction or the second correction, a correction on one grayscale value by both the first or second correction and the third or fourth correction is realized. As described previously, in a case that any one of the plurality of pixels 4 is the first pixel in the first or second correction as well as the second pixel in the third or fourth correction, the configuration exemplified in FIG. 6B can be beneficial.

Either of the third correction and the fourth correction can be carried out by the second correction circuit 62. In accordance with the manner of change in the grayscale value between the two pixels consecutively selected, either of the third correction and the fourth correction can be carried out or neither of them is possibly carried out on the grayscale value determined in accordance with the transmittance each one of the plurality of pixels 4 is to have. While not shown, the second addition unit 623 can combine the third correction amount Cn3 or the fourth correction amount Cn4, and the second grayscale value Pd4. Then, the image signal after correction by the third or fourth correction (with the first or second correction not being carried out) can be output from the second addition unit 623. The first correction circuit 61 and the second correction circuit 62 are realized by an internal arithmetic circuit such as an ASIC, configuring the timing control unit 3, for example.

In the example in FIG. 6B, the second determination unit 622 extracts position information Ip on the first pixel and the second pixel corresponding to the first grayscale value Pd3 and the second grayscale value Pd4 from a first synchronization signal Id1s taken out from the first image signal and synchronization signal Id1. In the example in FIG. 6B, the second determination unit 622 can have the plurality of LUTs 624 in which mutually different correction amounts are stored. For example, the LUT 624 can be provided for each position of the display screen of the liquid-crystal display panel 2 (see FIG. 1) and the second determination unit 622 can also select the LUT 624 to be referred to based on the position information Ip. In a case that the plurality of pixels of the liquid-crystal display panel have mutually different properties for each position, the position information Ip can be used in this way to carry out a more suitable correction. While not shown, the first determination unit 612 also can have the plurality of LUTs 614, or the LUT 614 to be referred to can be selected based on the position information Ip being input. Based on the position information Ip, a correction of the first to fourth corrections to be carried out can be selected.

Figure 6C:
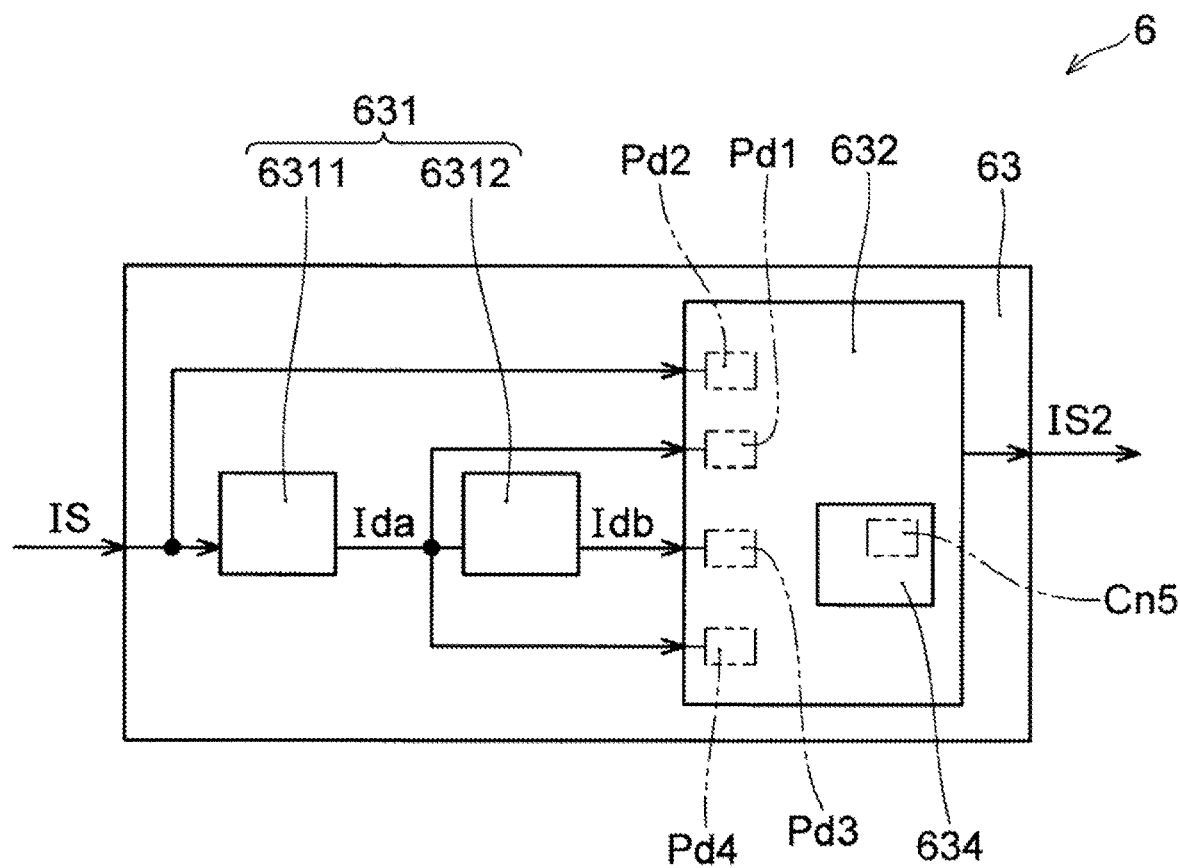
FIG. 6C shows yet another example of the configuration of the image signal correction unit according to one embodiment of the present disclosure.

FIG. 6C shows a further different example of the image signal correction unit 6. The image signal correction unit 6 in FIG. 6C is configured by a third correction circuit 63 also generally having functions of the first correction circuit 61 and the second correction circuit 62 in FIG. 6B. The image signal correction unit 6 in FIG. 6C comprises a third delay unit 631 comprising a first delay unit 6311 and a second delay unit 6312, and a third determination unit 632. The third determination unit 632 comprises an LUT 634. The third determination unit 632 determines a fifth correction amount Cn5 that can substitute for a correction amount into which the first correction amount Cn1 or the second correction amount Cn2 and the third correction amount Cn3 or the fourth correction amount Cn4 are combined. Then, the third determination unit 632 outputs a corrected image signal IS2 including a grayscale value combined with the fifth correction amount Cn5.

The first delay unit 6311 outputs a first delayed image signal and synchronization signal Ida obtained by delaying the image signal and synchronization signal IS by a time corresponding to one scan period of the liquid-crystal display panel 2 (see FIG. 1). The second delay unit 6312 outputs a second delay image signal and synchronization signal Idb obtained by delaying the image signal and synchronization signal IS by a time corresponding to two scan periods of the liquid-crystal display panel 2. The third determination unit 632 determines the fifth correction amount Cn5 based on both the state of difference between the first grayscale value Pd1 in the first correction or the second correction and the second grayscale value Pd2 in the first correction or the second correction, and the state of difference between the first grayscale value Pd3 in the third correction or the fourth correction and the second grayscale value Pd4 in the third correction or the fourth correction. The first grayscale value Pd1 in the first correction or the second correction and the second grayscale value Pd4 in the third correction or the fourth correction are included in the first delayed image signal and synchronization signal Ida. The second grayscale value Pd2 in the first correction or the second correction is included in the image signal and synchronization signal IS. The first grayscale value Pd3 in the third correction or the fourth correction is included in the second delayed image signal and synchronization signal Idb. The LUT 634 stores therein correction amounts each set in accordance with combination of values of each of three parameters being the first grayscale value Pd1 (=the second grayscale value Pd4), the first grayscale value Pd3, and the second grayscale value Pd2. The third determination unit 632 determines the fifth correction amount Cn5 with reference to the LUT 634.

The corrected image signal IS2 in the example in FIG. 6C can have the same value as the corrected image signal IS2 in the example in FIG. 6B. In addition, it is possible to carry out an auxiliary correction than the configuration shown in FIG. 6B. For example, in the configuration in FIG. 6B, there is a constraint that the difference between the image signal and synchronization signal IS being the input of the image signal correction unit 6 and the corrected image signal IS2 being the output equals the sum (or the difference) of the first correction amount Cn1 or the second correction amount Cn2, and the third correction amount Cn3 or the fourth correction amount Cn4. However, with the configuration in FIG. 6C, there is not such a constraint. Thus, the first correction amount Cn1 or the second correction amount Cn2, and the third correction amount Cn3 or the fourth correction amount Cn4 can also be combined non-linearly. While the circuit size increases since there are three parameters for the LUT 634, the image signal correction unit 6 can comprise the configuration in FIG. 6C.

[Operation of Image Signal Correction Unit]

Figure 7A:
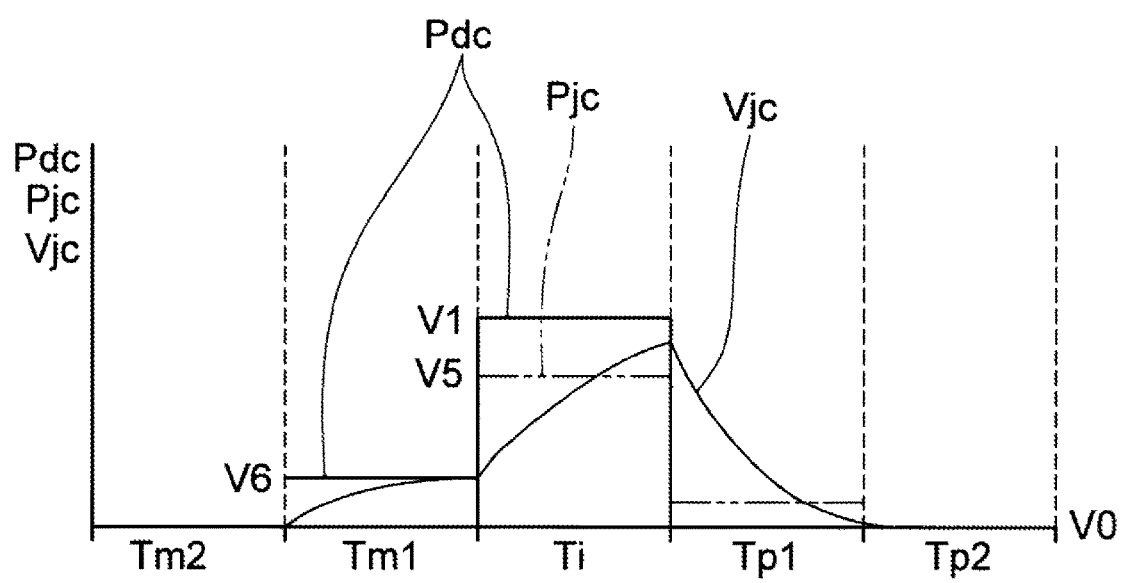
FIG. 7A shows one example of the first correction by the image signal correction unit according to one embodiment of the present disclosure.

Operation of the first correction and the fourth correction of the image signal correction unit 6 is explained with reference to FIGS. 7A and 7B. FIG. 7A shows, with a case in which the letter "S" shown in FIG. 3 is displayed as an example, a series of pixel data Pdc indicating grayscale values being corrected by the first correction, the grayscale values to be applied to the column j data line in FIG. 3. The pixel data Pdc is shown in the same manner as the pixel data Pda in FIG. 4A. Moreover, in the same manner as FIG. 4A, FIG. 7A shows electric potential Vjc of column j data line and virtual pixel data Pjc (in a chain double dashed line) equivalent to the electric potential Vjc. In the explanations below, "pixel data of a (specific) scan period" represents pixel data to be applied to the column j data line in that specific scan period. Moreover, "a pixel of a (specific) scan period" and "a grayscale value of a (specific) scan period" respectively represent a pixel connected to the column j data line and selected in that specific scan period and a grayscale value applied to the pixel selected in that specific scan period.

With reference to FIGS. 7A and 4A together, the first correction is carried out with the pixel of the scan period Tm1 as the first pixel and then the pixel of the scan period Ti as the second pixel. In other words, the grayscale value of the scan period Tm1 (the first grayscale value) is brought closer to the second grayscale value by a first correction amount (V6−V0) with an aim to bring the grayscale value of the scan period Ti closer to the second grayscale value (the grayscale value V1).

As shown in FIG. 7A, as the pixel data of the scan period Tm1 is being corrected, the electric potential Vjc of the column j data line is starting to rise in the scan period Tm1, and, at the time of transition to the scan period Ti, reaches the electric potential higher than the electric potential Vja in FIG. 4A. Therefore, in the scan period Ti, the gradually rising electric potential Vjc of the column j data line can be made to reach the electric potential higher than the electric potential Vja in FIG. 4A. As a result, as the virtual pixel data Pjc indicates, a grayscale value V5 being higher than the grayscale value V2 shown in FIG. 4A is applied to the pixel of the scan period Ti (the second pixel). Thus, deterioration of display quality exemplified in FIG. 4B being referred to previously can be suppressed.

Figure 7B:
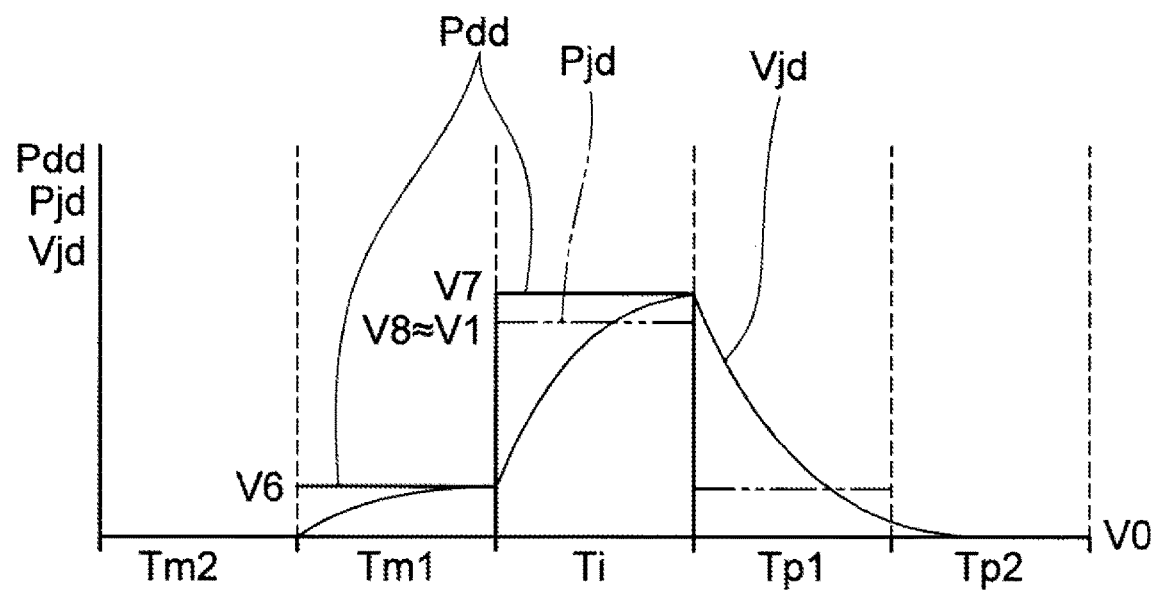
FIG. 7B shows one example of the first correction and the fourth correction by the image signal correction unit according to one embodiment of the present disclosure.

In FIG. 7B is shown a series of pixel data Pdd indicating grayscale values being corrected by the fourth correction in addition to the first correction shown in FIG. 7A. This fourth correction is also carried out with the pixel of the scan period Tm1 as the first pixel and then the pixel of the scan period Ti as the second pixel. In other words, the grayscale value of the scan period Ti is corrected to a grayscale value V7 shown in FIG. 7B from the grayscale value V1 shown in FIG. 7A with an aim to bring the grayscale value applied to the pixel of the scan period Ti even closer to the grayscale value according to the transmittance the second pixel is to have (the second grayscale value). More specifically, the grayscale value of the scan period Ti (the second grayscale value) is corrected by the fourth correction amount (V7−V1) to be brought farther away from the grayscale value V0 of the scan period Tm1 being the first grayscale value.

As shown in FIG. 7B, the fourth correction in addition to the first correction being carried out causes the electric potential Vjd of the column j data line to reach the electric potential higher than the electric potential Vjc shown in FIG. 7A. As a result, in FIG. 7B, the virtual pixel data Pjd equivalent to the electric potential Vjd of the column j data line shown in FIG. 7B has, in the scan period Ti, substantially the same grayscale value V8 as the grayscale value V1 of the pixel data Pda shown in FIG. 4A. Therefore, the pixel of the scan period Ti (the second pixel) can have a suitable transmittance.

Moreover, by carrying out the first correction and the fourth correction as shown in the example in FIG. 7B, it is possible to make the fourth correction amount smaller relative to a case in which only the fourth correction is carried out. Thus, the effect on the transmittance of the pixel of the scan period Tp1 by the fourth correction can be reduced. In other words, the pixel of the scan period Ti can have a more suitable transmittance and the pixel of the scan period Tp1 can also have a transmittance closer to the intended transmittance relative to the case in which only the fourth correction is carried out. Therefore, deterioration of display quality can be suppressed further as the entire display image.

Now, with the examples in FIG. 7A and FIG. 7B, the grayscale value of the scan period Tm1 is corrected to a grayscale value V6 from 0 grayscale by the first correction, so that the pixel of the scan period Tm1 seemingly cannot have a desired transmittance. However, such a problem due to the corrections can substantially be prevented from generally occurring by appropriately selecting a correction amount in accordance with the grayscale value to be corrected. This point will be described below.

Figure 8A:
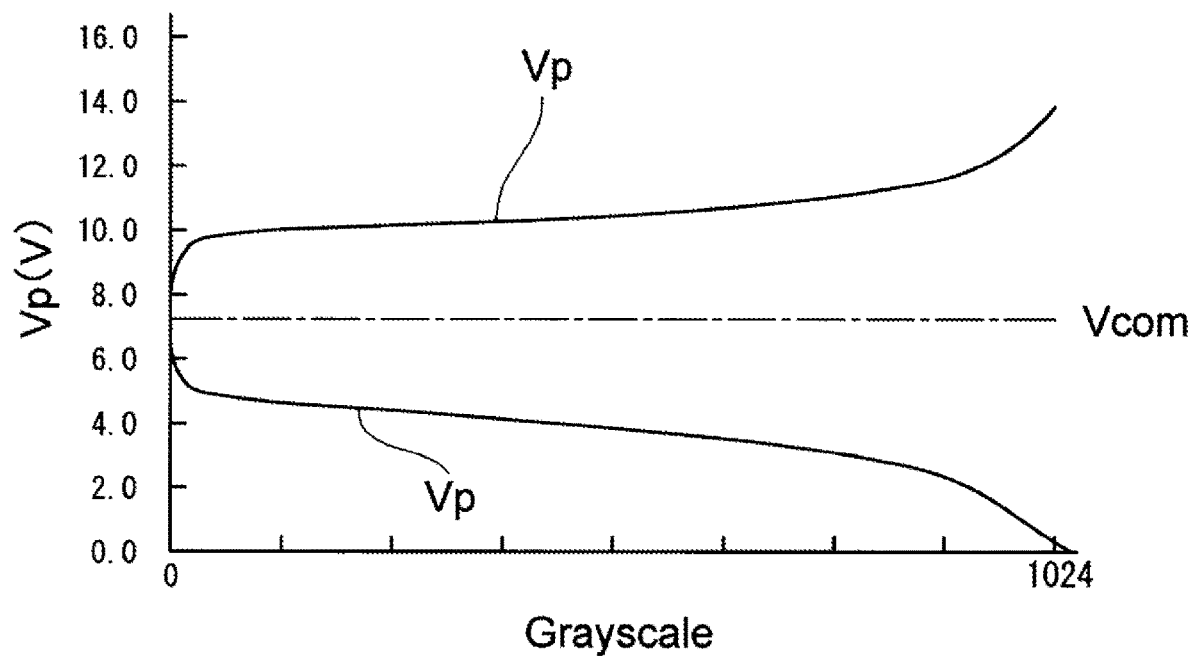
FIG. 8A shows a grayscale-voltage curve the liquid-crystal display apparatus according to one embodiment of the present disclosure can have.

The relationship between the luminance and the grayscale value in each pixel of the liquid-crystal display panel is preferably made as a so-called a γ curve having a γ value 2.2, for example. Realizing this γ curve taking into account the dependency on the applied voltage of the transmittance of the liquid crystal, the curve showing the relationship between each grayscale value and the voltage to be applied to the liquid crystal layer (a grayscale-voltage curve) to obtain the luminance of each grayscale value will be nonlinear as shown in one example in FIG. 8A. FIG. 8A is an example of the grayscale-voltage curve in a case that the grayscale range is between 0 grayscale to 1024 grayscale and the electric potential Vp of the pixel electrode is shown on both positive/negative sides relative to the electric potential Vcom of the common electrode. As shown in FIG. 8A, the voltage difference for each grayscale is large in the low grayscale and high grayscale ranges, the tendency of which is particularly salient in the low grayscale range. In other words, in the low grayscale and high grayscale ranges, slightly changing the grayscale value causes the voltage to be applied to the liquid crystal layer to be widely changed.

Thus, in the example in FIG. 7A, in a case that the grayscale value of the scan period Tm1 being 0 grayscale is corrected, the electric potential applied to the column j data line in the scan period Tm1 can be effectively brought closer to the electric potential applied in the scan period Ti with a relative small correction amount. In other words, the electric potential of the column j data line can be increased to the electric potential close to a desired electric potential in a period of the scan period Ti with a comparatively small correction amount on the grayscale value of the scan period Tm1, and the display quality can be improved effectively. Even when the grayscale value of the scan period Tm1 is in a range of high grayscale (for example, 4095 grayscale), the display quality can be improved effectively although it is not as much as in a case of low grayscale.

Figure 8B:
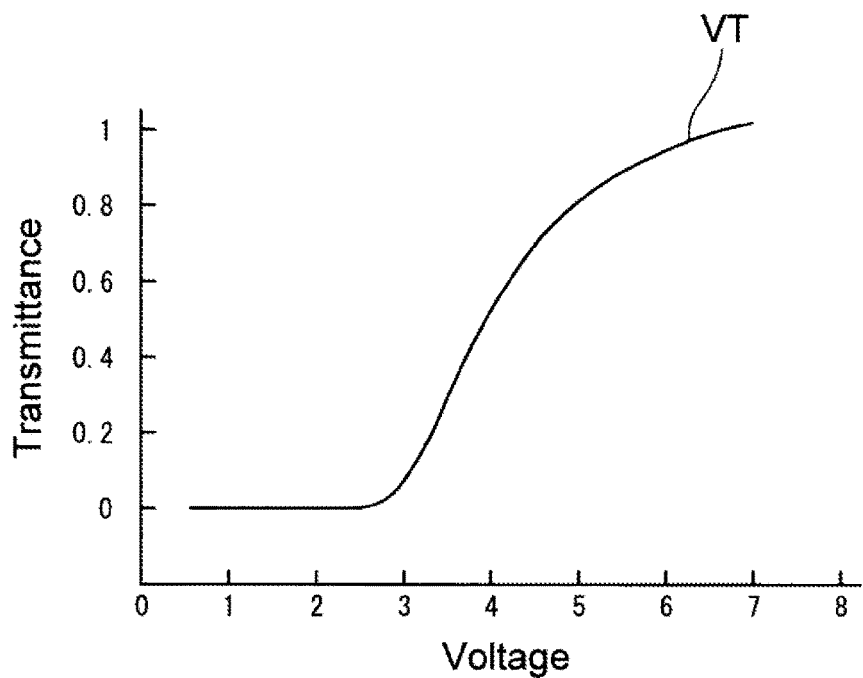
FIG. 8B shows a V-T curve the liquid-crystal display apparatus according to one embodiment of the present disclosure can have.

In addition, as it can be understood from the liquid crystal characteristics VT (a V-T curve) as shown in FIG. 8B, with respect to the relationship between the voltage applied to the liquid crystal layer and the transmittance, the change of transmittance relative to a change in voltage is small in the low grayscale range (low transmittance range) and high grayscale range (high transmittance range). Moreover, in a case of a display pattern including the identical luminance pattern (a so-called solid pattern) in a large area on the display screen, when there is an error relative to the luminance to be displayed primarily, a change of luminance is easily recognized visually even if an amount of the error is small. However, even with an error of the luminance of the same amount, in a case that the area of the error is small, it is difficult for the change of the luminance to be visually recognized. Thus, in the example in FIG. 7A, even when the grayscale value of the scan period Tm1 being 0 grayscale is corrected, it is difficult for the change of the luminance to be visually recognized, and it is difficult for substantial deterioration of display quality in the scan period Tm1 to occur. In the present embodiment, such a relationship between the voltage to be applied to the liquid crystal layer, and the grayscale value and the transmittance can be utilized. In other words, in a case that the grayscale value to be corrected is in the low grayscale range or the high grayscale range, it is possible to make the unintended effect by the correction difficult to be felt by a person viewing the screen and it is possible to suppress deterioration of display quality that can occur with an increase in the number of pixels. In particular, in a case that the grayscale value to be corrected is in the low grayscale range, the unintended effect by the correction can be substantially reduced and deterioration of display quality can be suppressed effectively.

In other words, in a case that the grayscale value to be corrected (for example, the first grayscale value in the first correction) is in the intermediate grayscale range, the correction to bring the first grayscale value closer to the second grayscale value (the first correction) can have a small effect on the correction amount, or have an unintended effect by the correction visually recognized. Similarly, in the intermediate grayscale range, the correction to bring the second grayscale value closer to the first grayscale value (the third correction) can also have a small effect thereon, or have the effect visually recognized. In such a case, it is preferable not to carry out the first correction and the third correction. Thus, in FIG. 7A and FIG. 7B, the first correction with the pixel of the scan period Ti to have the transmittance according to the grayscale value V being intermediate grayscale (2048 grayscale) as the first pixel is not carried out.

Therefore, in the present embodiment, the image signal correction unit 6 can correct the first grayscale value with a larger correction amount in the first correction in a case that the first grayscale value is in the low grayscale range or high greyscale range than in a case that the first grayscale value is in the intermediate grayscale range. For example, in a case that the first grayscale value is no greater than a given first reference value or no less than a given second reference value being greater than this first reference value, the first correction circuit 61 can make the first correction amount larger relative to a case that the first grayscale value is greater than the first reference value and less than the second reference value. Moreover, in a case that the first grayscale value is greater than the first reference value and less than the second reference value, the first correction circuit 61 can set the first correction amount to zero. Moreover, in a case that the first grayscale value is a minimum grayscale, the first correction circuit 61 can correct the first correction amount in a larger magnitude relative to a case that the first grayscale value is a maximum grayscale. The first reference value and the second reference value are set as in the example shown below, for example.

In the V-T curve as shown in FIG. 8B, the slope thereof changes from being gentle to being steep from minimum voltage toward intermediate voltage and the slope thereof changes being steep to being gentle from intermediate voltage toward maximum voltage. The first reference value is set around where the slope of the V-T curve exceeds a certain value, for example. Then, the second reference value is set around where the slope of the V-T curve falls below a certain value, for example. Moreover, in the grayscale-voltage curve as shown in FIG. 8A, the slope thereof changes from being steep to being gentle from minimum grayscale toward intermediate grayscale and the slope thereof changes being gentle to being steep from intermediate grayscale toward maximum grayscale. The first reference value is set around where the slope (the absolute value) of the grayscale-voltage curve falls below a certain value, for example. Then, the second reference value is set around where the slope (the absolute value) of the grayscale-voltage curve exceeds a certain value, for example.

Figure 9:
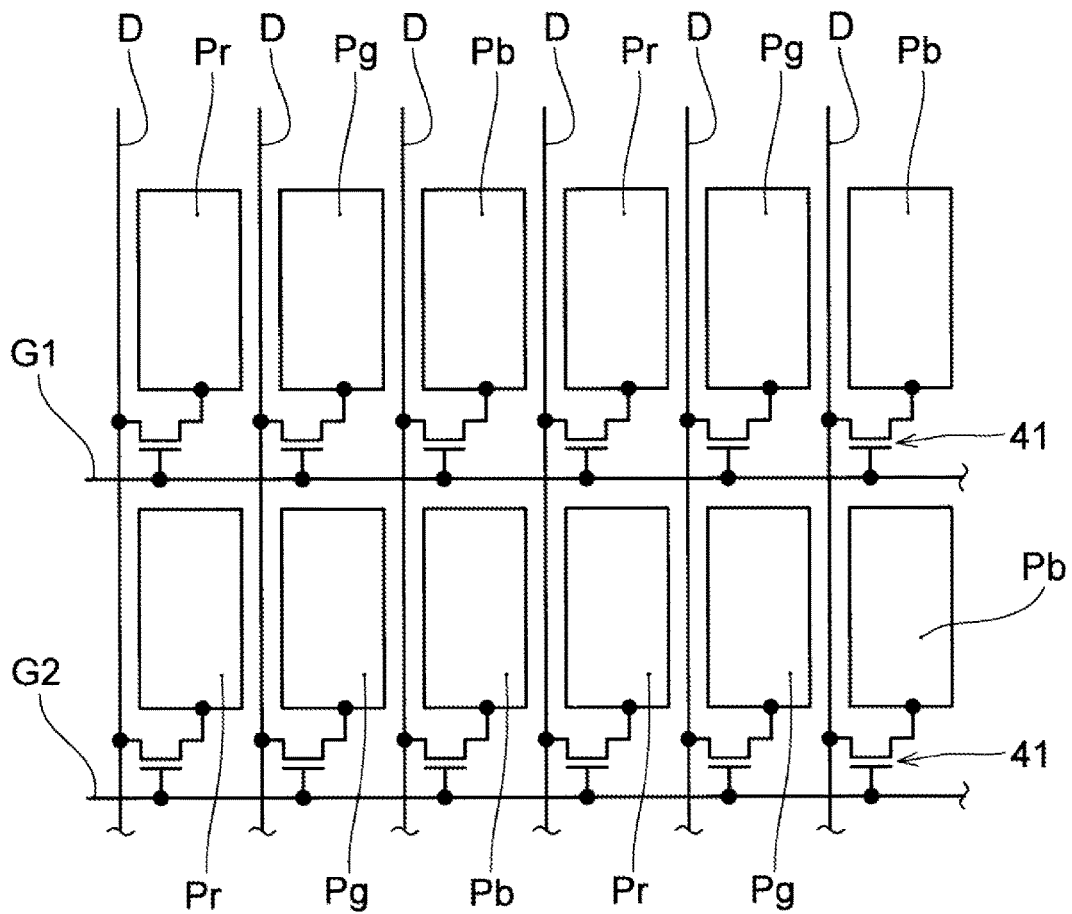
FIG. 9 shows one example of arrangement of pixels (sub-pixels) displaying respective colors in the liquid-crystal display apparatus according to one embodiment of the present disclosure.

Each one of the plurality of pixels 4 in the liquid-crystal display panel 2 can be a so-called sub-pixel. Each sub-pixel can display one color of a plurality of types of colors (for example, three colors of red, green, and blue) and full-color displaying can be realized with these three colors as one unit. FIG. 9 shows sub-pixels Pr, Pg, Pb of each color of red, green, and blue arranged in a so-called single scan TFT straight-line arrangement scheme being one example of such a sub-pixel arrangement. Each of a red sub-pixel Pr, a green sub-pixel Pg, and a blue sub-pixel Pb being successively arranged in the row direction is connected to the scanning line G1 or scanning line G2 via the TFT 41. The sub-pixels of the same color are mutually connected to the same data line D. To the scanning line G2, a scanning line signal to turn on the TFT 41 following the scanning line G1 is output. Thus, the sub-pixel connected to the scanning line G1 is to be the first pixel in each of the first to fourth corrections, while the sub-pixel connected to the scanning line G2 is to be the second pixel. In other words, in the example in FIG. 9, each pixel is arranged such that the first pixel and the second pixel in each of the first to fourth corrections are pixels (sub-pixels) to display mutually the same color.

While there are various structures, arrangements, and wire connections of the pixel 4, TFT 41, data line D, and scanning lines G1 to Gn in the liquid-crystal display panel 2, an arrangement as in FIG. 9 can be used to make it difficult to visually recognize the unintended effect in the previously-described first correction and third correction. This is because an error that can occur in the first pixel by the first correction, with respect to a given first grayscale value according to the transmittance to have primarily and an error that can occur in the same manner in the second pixel by the third correction are merely luminance errors. In other words, a hue error does not occur in the above-described one unit comprising the three sub-pixels. Thus, a change in luminance or hue can be difficult to be recognized, so that the first correction and the third correction can be applied most effectively. The first pixel and the second pixel can display different colors, in which case the first correction amount and the third correction amount are preferably reduced so as to make the hue error that can occur in the above-described one unit difficult to be visually recognized.

[Operation of Second Correction]

Figure 10A:
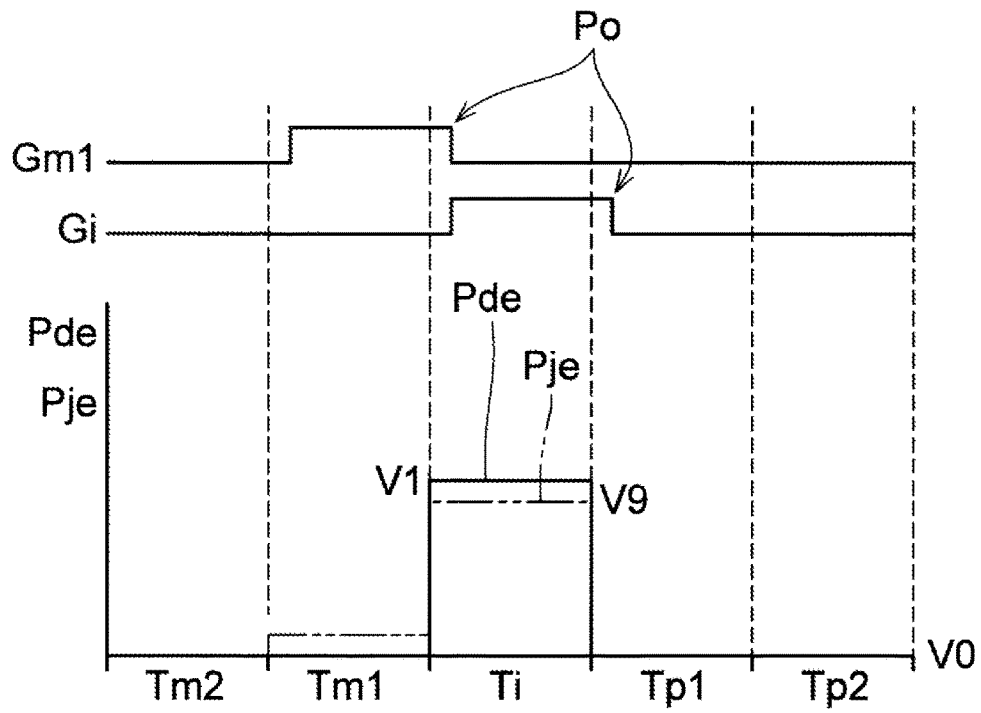
FIG. 10A shows another example of pixel data, and pixel data equivalent to the electric potential of a pixel electrode, in a case that a correction by the image signal correction unit is not carried out.

An operation of the image signal correction unit 6 by the second correction will be explained with reference to FIGS. 10A to 10C. First, with reference to FIG. 10A, a circumstance that can occur in a case that the second correction is not carried out is explained. FIG. 10A shows, in a manner similar to the series of pixel data Pda in FIG. 4A, a series of pixel data Pde. The grayscale value V0 is 0 grayscale, while the grayscale value V1 is intermediate grayscale (for example, 2048 grayscale in the entire 4096 grayscales). Moreover, FIG. 10A shows an on pulse Po for the scanning line Gm1, Gi respectively selected in the scan period Tm1 and the scan period Ti. FIG. 10A further shows, in a chain double dashed line, virtual pixel data Pje equivalent to the electric potential that the pixel electrode of the pixel selected in each scan period can actually have.

As described previously, the scanning line signal being output to the scanning line Gm1*l* may cause deformation in the waveform thereof on the scanning line Gm1. In that case, the on pulse Po included in the scanning line signal reaches each pixel with a substantial delay. As a result, as in the example in FIG. 10A, the on pulse Po on the scanning line Gm1 may fall with a delay relative to the time of completion of the scan period Tm1 and, similarly, the on pulse Po on the scanning line Gi may also fall with a delay relative to the time of completion of the scan period Ti. In that case, the TFT of the pixel of the scan period Ti is kept on state despite that the electric potential of the data line connected to the pixel of the scan period Ti is starting to change to the electric potential according to the scan period Tp1 in conjunction with the completion of the scan period Ti, for example. As a result, in FIG. 10A, the electric potential of the pixel electrode of the pixel of the scan period Ti is to be not the electric potential according to the proper grayscale value V1, but the electric potential according to a grayscale value V9 in the virtual pixel data Pje. In such a case, the pixel of the scan period Ti cannot have the proper transmittance, causing luminance unevenness.

Even in the display panel 2 (see FIG. 1) according to the present embodiment, the electric potential of the data lines D1 to Dm connected to the first pixel (see FIG. 1) starts changing from the electric potential based on the first grayscale value to the electric potential based on the second grayscale value while the first pixel in each of the first to fourth corrections is being selected. The second correction and the third correction are particularly beneficial in such a case.

Figure 10B:
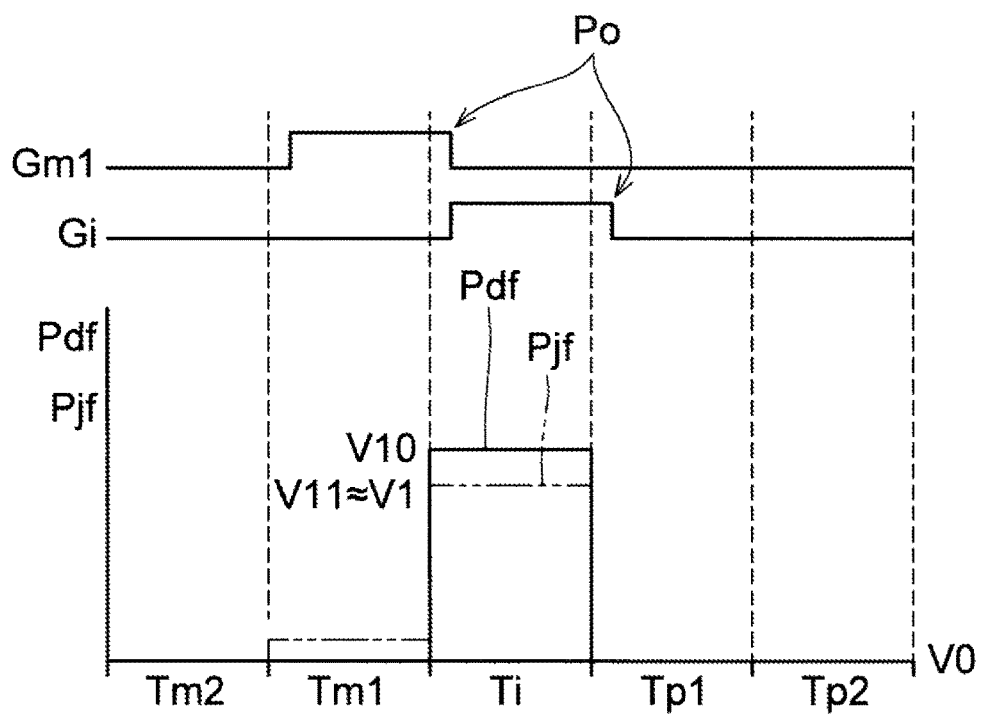
FIG. 10B shows one example of the second correction by the image signal correction unit according to one embodiment of the present disclosure.

In FIG. 10B is shown a series of pixel data Pdf being corrected by the second correction with the pixel of the scan period Ti in the example in FIG. 10A as the first pixel and the pixel of the scan period Tp1 in the example in FIG. 10A as the second pixel, and is shown the pixel data Pjf equivalent to the electric potential of the pixel electrode of the pixel of each scan period. As shown in FIG. 10B, with an aim to bring the transmittance of the first pixel (the pixel of the scan period Ti) closer to the transmittance according to the first grayscale value (the grayscale value V1), the grayscale value of the scan period Ti is being brought farther away from the second grayscale value (the grayscale value V0 of the scan period Tp1). More specifically, the grayscale value of the scan period Ti is being corrected to a grayscale value V10 being greater than the grayscale value V1 shown in FIG. 10A, and grayscale value of the scan period Ti is being brought farther away from the second grayscale value by a second correction amount (V10-V1). As a result, in the scan period Ti, the pixel data Pjf equivalent to the electric potential of the pixel electrode of the first pixel reaches a grayscale value V11 being closer to the grayscale value V1 than the grayscale value V9 in FIG. 10A. Therefore, relative to the case of FIG. 10A, the first pixel (the pixel of the scan period Ti in FIG. 10B) has the transmittance close to a desired transmittance, causing display quality to improve relative to the case of FIG. 10A.

Figure 10C:
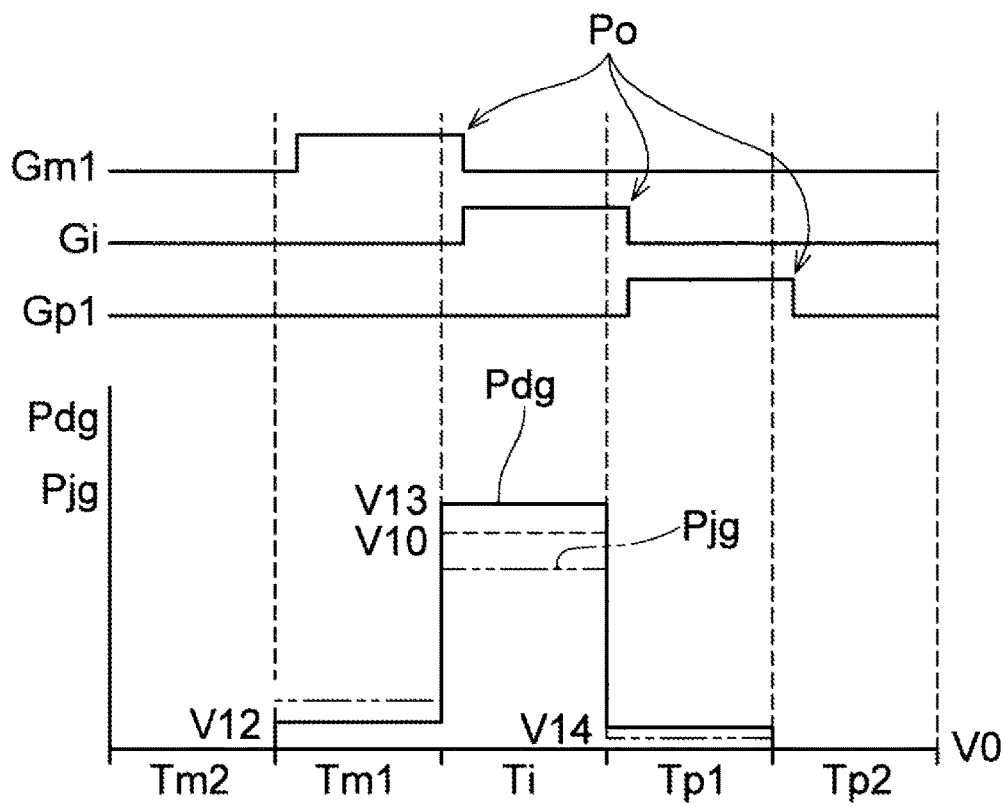
FIG. 10C shows one example of the first correction to the fourth correction by the image signal correction unit according to one embodiment of the present disclosure.

In FIG. 10C is shown a series of pixel data Pdg after corrections in a case that the first correction, the third correction, and the fourth correction are carried out in addition to the second correction shown in FIG. 10B, and is shown the pixel data Pjg equivalent to the electric potential of the pixel electrode of the pixel of each of the scan period Tm1*l*, the scan period Ti, and the scan period Tp1. The pixel of the scan period Tp1 is selected by the on pulse Po being output to the scanning line Gp1. In the example in FIG. 10C, in the same manner as in the example in FIG. 7A, the first correction is carried out with the pixel of the scan period Tm1 as the first pixel and the pixel of the scan period Ti as the second pixel, and the grayscale value of the scanning period Tm1 is corrected to a grayscale value V12. Moreover, the fourth correction is carried out with the pixel of the scan period Tm1 as the first pixel and the pixel of the scan period Ti as the second pixel, and the grayscale value of the scan period Ti is corrected to a grayscale V13 being even greater than the grayscale value V10. Furthermore, the third correction is carried out with the pixel of the scan period Ti as the first pixel and the pixel of the scan period Tp1 as the second pixel, and the grayscale value of the scan period Tp1 is corrected to a grayscale V14.

In this way, by carrying out the first to fourth corrections in a composite manner, the transmittance each of the plurality of pixels 4 actually has can be possibly brought even closer to the transmittance to have primarily. While the grayscale value in the scan period Tm1 and the scan period Tp1 is above the desired grayscale value V0 (0 grayscale) in FIG. 10C, since it is in the low grayscale range, the effect due to an error of the grayscale value is difficult to be recognized visually as described previously, so that it is unlikely to be a major problem.

[Example of First to Fourth Corrections on Various Changes of Grayscale Values]

FIGS. 11A to 11F show one example of changes in a series of grayscale values H to be applied to pixels (pixels P1, P2, and the like) successively selected in sequence in a series of scan periods. Moreover, in FIGS. 11A to 11F show the first to fourth corrections C1, C2, C3, C4 carried out in accordance with the changes in the grayscale values. Here, hatchings by lines slanted in the upper-right direction show the first correction and the second correction C1, C2, which hatching thereof with a wider interval of the slanted lines shows the first correction C1 and which hatching thereof with a narrower interval of the slanted lines shows the second correction C2. Moreover, hatchings by lines slanted in the upper-left direction show the third correction and the fourth correction C3, C4, which hatching thereof with a wider interval of the slanted lines shows the third correction C3 and which hatching thereof with a narrower interval of the slanted lines shows the fourth correction C4. Moreover, arrows shown in each of the first to fourth corrections C1, C2, C3, and C4 show the direction of change in the grayscale value by each correction, the upward arrow showing that the correction amount is positive (a correction in the positive direction) and the downward arrow showing that the correction amount is negative (a correction in the negative direction). Moreover, in FIGS. 11A to 11F, the grayscale value H0 shows low grayscale (for example, 0 grayscale), the grayscale value H1 shows intermediate grayscale (for example, 2098 grayscale in the entire 4096 grayscales), and the grayscale value H2 shows high grayscale (for example, 4095 grayscale in the entire 4096 grayscales).

Figure 11A:
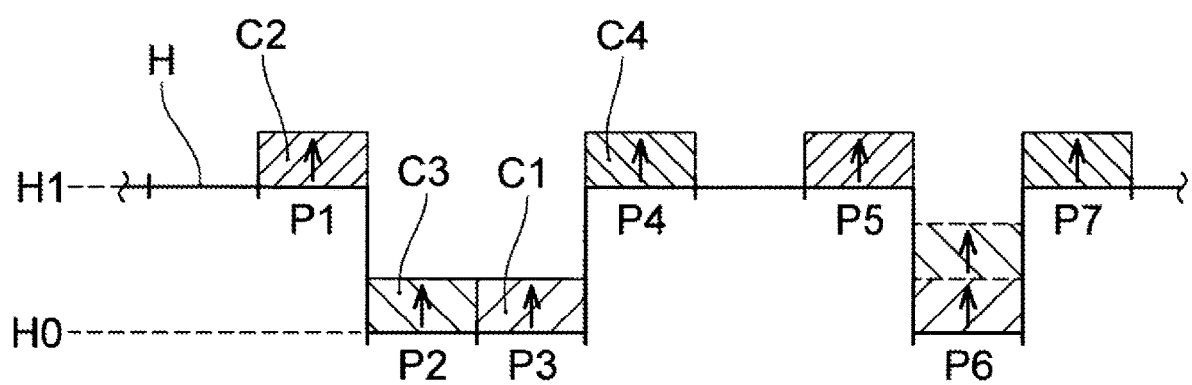
FIG. 11A shows one example of each correction carried out on a change in a grayscale value according to one embodiment of the present disclosure.

In FIG. 11A, in the pixel P1, the second correction C2 in the positive direction is carried out with the pixel P1 as the first pixel and then the pixel P2 as the second pixel. The grayscale value of the pixel P1 is the grayscale value H1 being intermediate grayscale, so that the first correction C1 is not carried out. In the pixel P2, the grayscale value of the pixel P2 is the grayscale value H0 (0 grayscale) and the unintended effect on the transmittance of the pixel P2 is small, so that the third correction C3 in the positive direction with the pixel P1 as the first pixel is carried out. On the contrary, the effect on the transmittance of the pixel P2 is small, so that the fourth correction C4 is not carried out. In a pixel P3 and a pixel P4, the first correction C1 and the fourth correction C4 are carried out, respectively in the same manner as in FIG. 7B.

On the other hand, in a pixel P6, the first correction in the positive direction can be carried out between the pixel P6 and a pixel P7 and the third correction in the positive direction can be carried out between the pixel P6 and a pixel P5. In this case, the pixel P6 is the second pixel in the third correction as well as the first pixel in the first correction. However, either or both of these first and third corrections do not necessarily have to be carried out. The reason is that, since the grayscale values of the pixel P5 and the pixel P7 are both higher than the grayscale value of the pixel P6, due to the effect thereof, there is a tendency for the grayscale value actually applied to the pixel P6 to be higher than the grayscale value to be applied primarily (0 grayscale in FIG. 11A). If the first correction and/or the third correction in the positive direction carried out despite such a tendency, a deviation (an error) from the grayscale value to be applied primarily can become too large in the grayscale value actually applied to the pixel P6. As a result, the effect of that error can be easily recognized visually although the grayscale value to be applied primarily is in the low grayscale range. Thus, in the pixel P6, it can be preferable that either or both of the first correction and the third correction be not carried out.

Figure 11B:
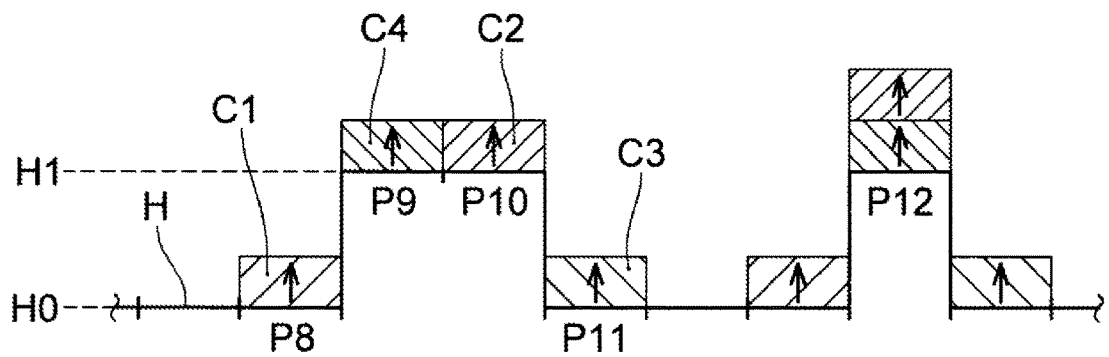
FIG. 11B shows another example of each correction carried out on the change in the grayscale value according to one embodiment of the present disclosure.

In FIG. 11B, the first correction C1 or the third correction C3 is carried out in a pixel P8 and a pixel P11 having low grayscale, while the fourth correction C4 or the second correction C2 is carried out in a pixel P9 and a pixel P10 having intermediate grayscale. Moreover, both the second correction and the fourth correction are carried out in a pixel P12 having intermediate grayscale. The second correction and the fourth correction on the grayscale value of the pixel P12 is a correction to bring the transmittance of the pixel P12 having intermediate grayscale closer to a desired transmittance, so that, even in a case that both of the second correction and the fourth correction are carried out, no problem is to occur. Depending on the grayscale value to be corrected in both the second correction and the fourth correction, due to carrying out both the second correction and the fourth correction in the same direction, a deviation (an error) from the grayscale value to be applied primarily can become excessively large. For example, in such a case, either or both of the second correction and the fourth correction can be made not carried out.

Figure 11C:
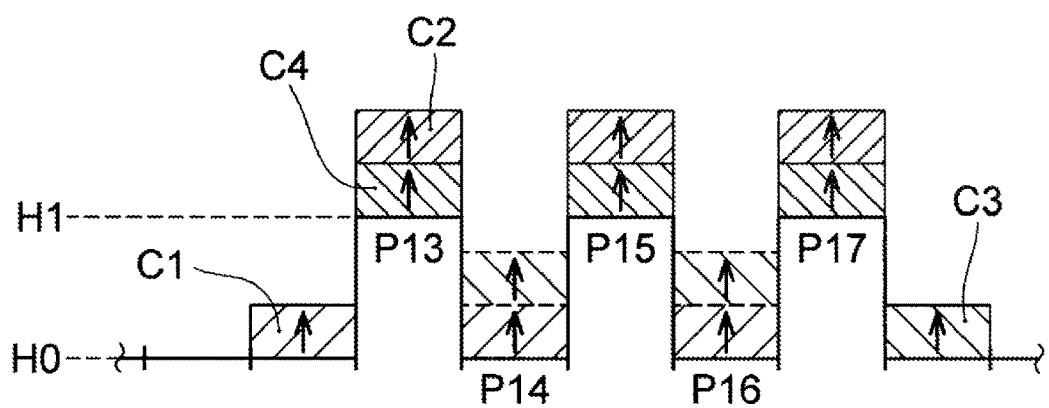
FIG. 11C shows yet another example of each correction carried out on the change in the grayscale value according to one embodiment of the present disclosure.

In FIG. 11C, in the same manner as the previously-described pixel P12, the second correction C2 and the fourth correction C4 are carried out on the grayscale value of a pixel P13, a pixel P15, and a pixel P17. On the other hand, the first correction C1 and the third correction C3 do not have to be carried out on the grayscale value of a pixel P14 and a pixel P16.

In FIGS. 11A to 11C, while the same type of corrections can be carried out in each of the pixels P1 to P17 in a case that the grayscale value H0 is high grayscale (for example, 4095 grayscale in the entire 4096 grayscales), in each correction, the direction thereof is to be reverse of the examples in FIGS. 11A to 11C.

Figure 11D:
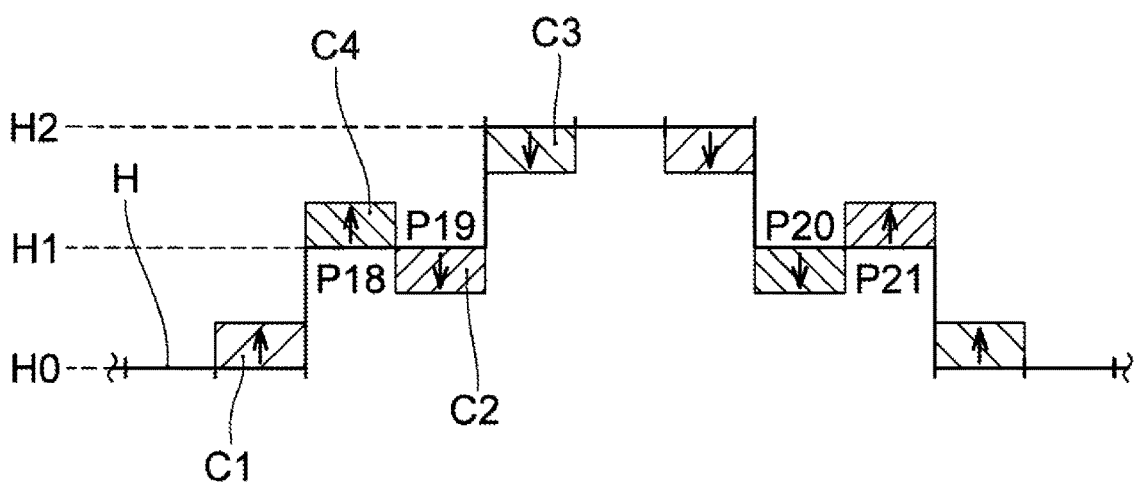
FIG. 11D shows yet another example of each correction carried out on the change in the grayscale value according to one embodiment of the present disclosure.
Figure 11E:
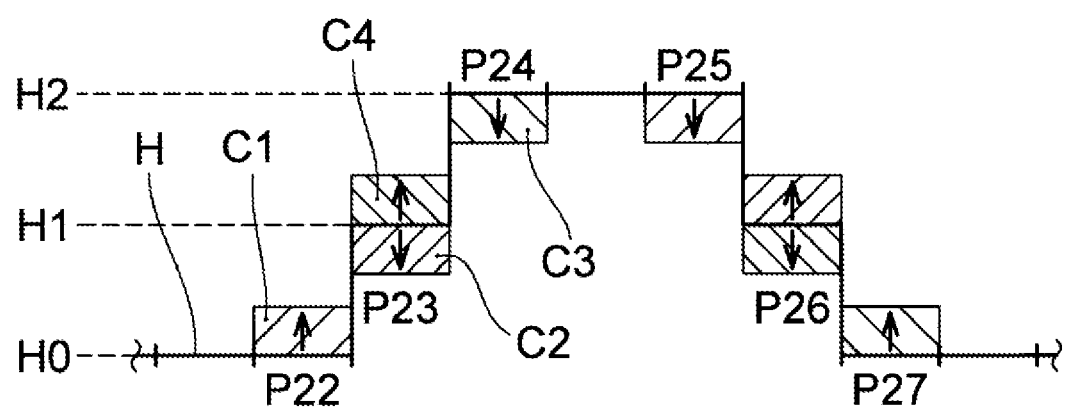
FIG. 11E shows yet another example of each correction carried out on the change in the grayscale value according to one embodiment of the present disclosure.

With reference to FIGS. 11D and 11E, the grayscale value H changes among the grayscale value H0 (0 grayscale), the grayscale value H1 (intermediate grayscale), and the grayscale value H2 (high grayscale). In FIG. 11D, the fourth correction C4 in the positive direction is carried out in a pixel P18 having intermediate grayscale, while the second correction C2 in the negative direction is carried out in a pixel P19 having intermediate grayscale similarly. Moreover, the fourth correction in the negative direction is carried out in a pixel P20, while the second correction in the positive direction is carried out in a pixel P21.

While the tendency of change in the grayscale value H in FIG. 11E is the same as the tendency of change in the grayscale value H in FIG. 11D, a pixel P23 is the second pixel in the fourth correction C4 carried out between the pixel P23 and a pixel P22 as well as the first pixel in the second correction C2 carried out between the pixel P23 and a pixel P24. Then, the grayscale value applied to the pixel P23 is corrected in the positive direction by the fourth correction C4 and corrected in the negative direction by the second correction C2. In other words, the grayscale value applied to the pixel P23 is corrected in mutually reverse directions by the second correction C2 and the fourth correction C4. Similarly, the grayscale value applied to a pixel P26 is corrected in mutually reverse directions by the fourth correction to be carried out between the pixel P26 and a pixel P25 and the second correction to be carried out between the pixel P26 and a pixel P27. In this way, according to the present embodiment, in a case that the first pixel in the second correction C2 is the second pixel in the fourth correction C4, the grayscale value to be corrected can be corrected in mutually reverse directions. Similarly thereto, in a case that the first pixel in the second correction C2 is the second pixel in the third correction C3, the grayscale value to be corrected can be corrected in mutually reverse directions. Moreover, in a case that the first pixel in the first correction C1 is the second pixel in the fourth correction C4, the grayscale value to be corrected can be corrected in mutually reverse directions. In other words, the direction of the first correction C1 or the second correction C2 and the direction of the third correction C3 or the fourth correction C4 on the grayscale value to be corrected being the first grayscale value in the first correction C1 or the second correction C2 and being the second grayscale value in the third correction C3 or the fourth correction C4 can be mutually reverse directions. As a result, the final correction amount can be less than an individual correction amount in each of the first to fourth corrections C1 to C4.

In FIG. 11F is shown an example in which the grayscale value H changes between H0 (0 grayscale) and H2 (4095 grayscale) of the entire 4096 grayscales. In this example, in 0 grayscale and 4095 grayscale, as an error by correction is difficult to be visually recognized, the second correction and the fourth correction are not carried out, and only the first correction C1 and the third correction C3 are carried out. In other words, in a pixel P28 having 0 grayscale H0, the first correction C1 in the positive direction with the pixel P28 as the first pixel is carried out, while, in a pixel P29 having 4095 grayscale H2, the third correction C3 in the negative direction with the pixel P29 as the second pixel is carried out. In a pixel P30 having 4095 grayscale H2, the first correction C1 in the negative direction with the pixel P30 as the first pixel is carried out, while, in a pixel P31 having 0 grayscale H0, the third correction C3 in the positive direction is carried out. Moreover, in a pixel P33, both of the third correction C3 in the negative direction with a pixel P32 as the first pixel and the pixel P33 as the second pixel and the first correction C1 in the negative direction with the pixel P33 as the first pixel and a pixel P34 as the second pixel are carried out. In the pixel P34, both of the third correction C3 in the positive direction with the pixel P33 as the first pixel and the pixel P34 as the second pixel and the first correction C1 in the positive direction with the pixel P34 as the first pixel and a pixel P35 as the second pixel are carried out.

[Rejection for Each Correction]

Here, as described above with respect to the pixel P6 in FIG. 11A, in a case that one pixel is to be the first pixel of the first correction or the second correction and is to be the second pixel of the third correction or the fourth correction, a correction on a grayscale value to be corrected (below called a grayscale value Px) which is applied to this one pixel is not necessarily carried out. Conditions 1 to 3 in a case that the correction on the grayscale value Px is not carried out are exemplified below.

First, it is exemplified as the first condition that the grayscale value Px (which is the first grayscale value in the first correction or the second correction and is the second grayscale value in the third correction or the fourth correction) is less (circumstance 1) or greater (circumstance 2) than both of the second grayscale value in the first or second correction and the first grayscale value in the third or fourth correction. Moreover, it is exemplified as the second condition 2 that the grayscale value Px is no greater than a given first setting value (for example, ⅛ grayscale value of the whole grayscales) in a case of the above-described circumstance 1 or no less than a given second setting value (for example, ⅞ grayscale value of the whole grayscales) in a case of the above-described circumstance 2. Furthermore, it is exemplified as the third condition 3 that both of the first correction amount or the second correction amount and the third correction amount or the fourth correction amount are negative (minus) correction amounts in the above-described circumstance 1, or positive (plus) correction amounts in the above-described circumstance 2.

For example, in a case that the condition 1 and the condition 2 are fulfilled, or the condition 1 and the condition 3 are fulfilled, either or both of the first or second correction and the third or fourth correction on the grayscale value Px can be rejected. In other words, only the first or second correction can be carried out, or only the third or fourth correction can be carried out, or not all of these corrections can be carried out.

[Variation of Image Signal Correction Unit]

Figure 12:
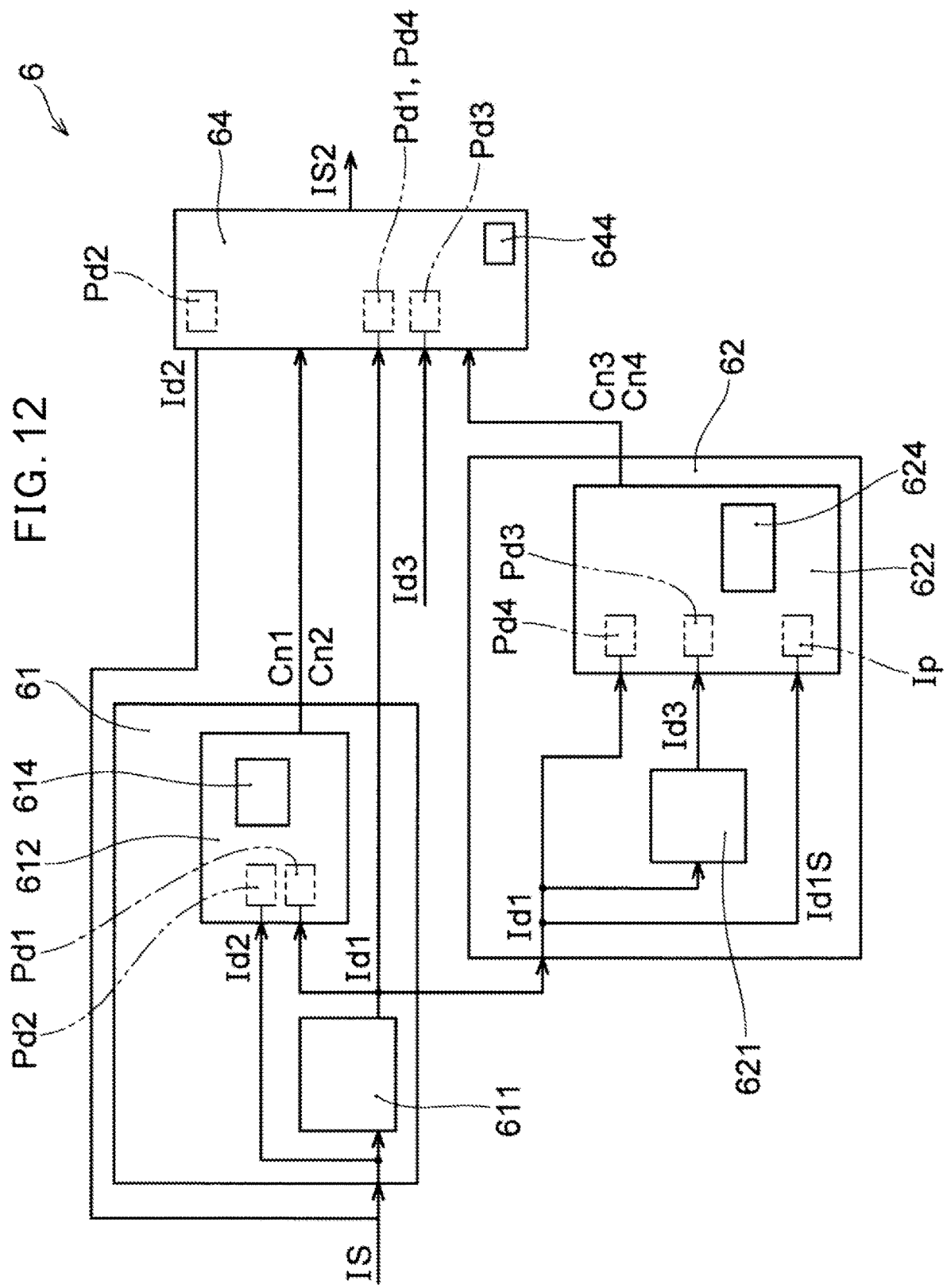
FIG. 12 shows yet another example of the image signal correction unit according to one embodiment of the present disclosure.

FIG. 12 shows a variation of the image signal correction unit 6 comprising a determination unit 64 to determine the fulfillment of the previously-described conditions 1 to 3. The image signal correction unit 6 in FIG. 12 comprises the first correction circuit 61 and the second correction circuit 62. The first correction circuit 61 shown in FIG. 12 does not comprise the first addition unit 613 included in the first correction circuit 61 in the example in FIG. 6B. Similarly, the second correction circuit 62 shown in FIG. 12 does not comprise the second addition unit 623 included in the second correction circuit 62 in the example in FIG. 6B. However, except these points, the first correction circuit 61 and the second correction circuit 62 shown in FIG. 12 are the same as the first correction circuit 61 and the second correction circuit 62 shown in the example in FIG. 6B. Explanations on the same constituting elements will be omitted.

To the determination unit 64 are input the first image signal and synchronization signal Id1, the second image signal and synchronization signal Id2, the third image signal and synchronization signal Id3, the first correction amount Cn1 or the second correction amount Cn2, and the third correction amount Cn3 or the fourth correction amount Cn4. Moreover, while not shown, the determination unit 64 comprises therein a storage unit such as a memory to store the previously-described first setting value and second setting value, or the first setting value and the second setting value are externally input thereto. Moreover, the determination unit 64 comprises therein a comparison unit (not shown) such as a comparator. Then, the determination unit 64 comprises an LUT 644 which stores how to carry out the corrections in accordance with a magnitude relationship between the first grayscale value Pd1, Pd3 and the second grayscale value Pd2, Pd4 in the first to fourth corrections, a magnitude relationship between these grayscale values and the first and second setting values, and the first to fourth correction amounts Cn1 to Cn4.

The determination unit 64 extracts, from each signal input, the first grayscale value Pd1 and the second grayscale value Pd2 in the first or second correction and the first grayscale value Pd3 and the second grayscale value Pd4 in the third or fourth correction. Moreover, using the comparison unit not shown, the determination unit 64 determines the magnitude relationship between each of these grayscale values, and the magnitude relationship between each of these grayscale values and the first and second setting values, or determines the magnitude relationship between each of these grayscale values, and whether the first to fourth correction amounts Cn1 to Cn4 are positive or negative. Moreover, the determination unit 64 refers to the LUT 644 based on the determination results and determines a correction to be carried out of the first to fourth corrections. Then, the determination unit 64 combines a suitable correction amount selected from the first to fourth correction amounts Cn1 to Cn4 with an image signal within the first image signal and synchronization signal Id1 and outputs the combined result as a corrected image signal IS2.

[Example of LUT]

Figure 13B:
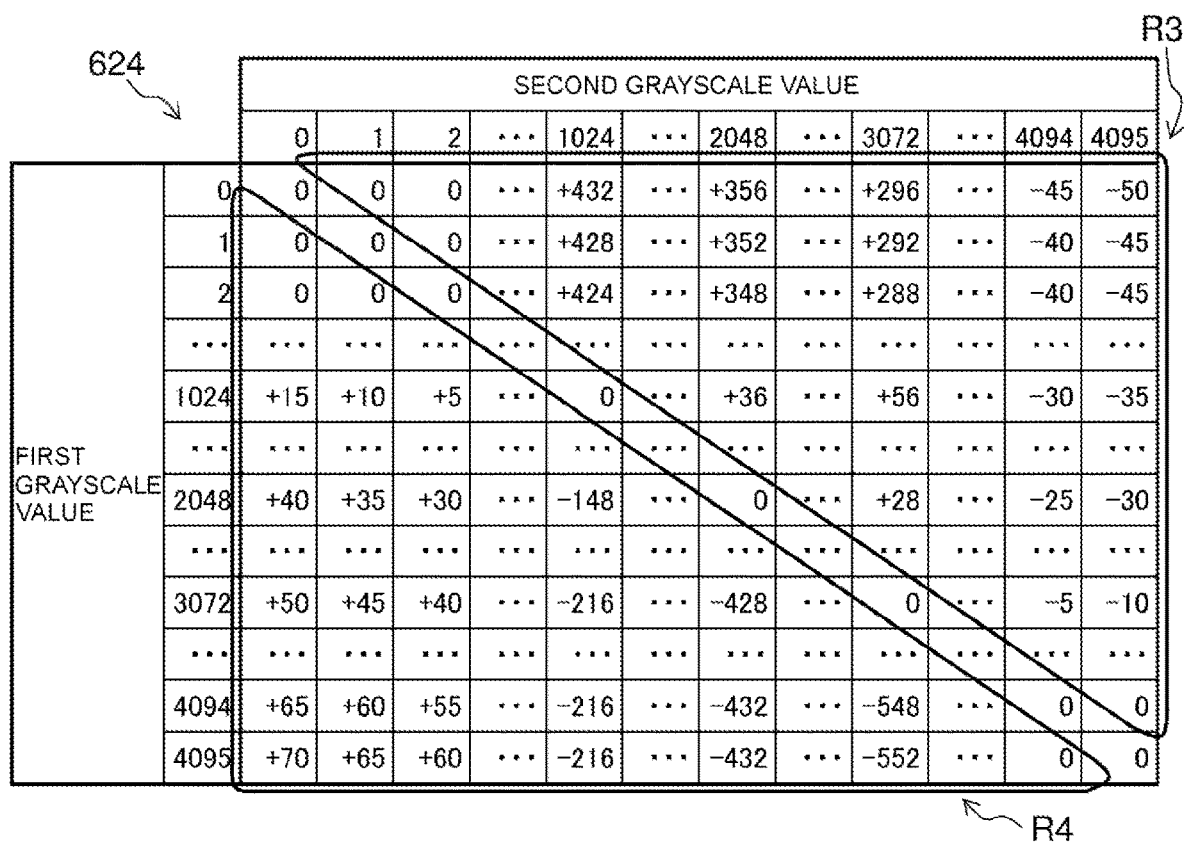
FIG. 13B shows one example of a third correction amount and a fourth correction amount being stored in the image signal correction unit according to one embodiment of the present disclosure.
Figures 13C, 14A:
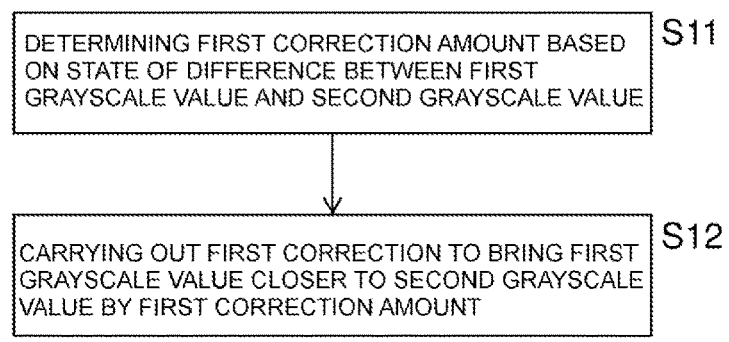
FIG. 13C shows another example of the fourth correction amount being stored in the image signal correction unit according to one embodiment of the present disclosure.
FIG. 14A is a flowchart showing one example of a method for correcting image signal according to another embodiment of the present disclosure.

FIG. 13A shows, in a simplified manner, one example of the first correction amount and the second correction amount being stored in the LUT 614 (see FIG. 6A), for example, with an aim to be used for the first correction or the second correction according to the present embodiment. Moreover, FIG. 13B and FIG. 13C show an example of the third correction amount and the fourth correction amount, respectively, being stored in the LUT 624 (see FIG. 6B), for example, with an aim to be used for the third correction or the fourth correction. FIGS. 13A to 13C are examples in a case that the first and second grayscale values are the entire 4096 grayscales.

In the example in FIG. 13A, the LUT 614 comprises a storage space associated with each of combinations of the first grayscale value and the second grayscale value in the first correction and the second correction, in each of which storage space, a correction amount used in the associated combination is stored. A first region R1 in the upper-right portion in FIG. 13A is a region in which the first grayscale value<the second grayscale value. Thus, a correction amount being positive in the first region R1 represents a correction amount to bring the first grayscale value closer to the second grayscale value. In other words, the correction amount being positive in the first region R1 represents a correction amount to be used in the first correction (the first correction amount). On the contrary, the correction amount being negative in the first region R1 represents the second correction amount.

On the other hand, in a second region R2 in the lower-left portion in FIG. 13A, the correction amount being negative represents the first correction amount, while the correction amount being positive represents the second correction amount. For example, in the example in FIG. 13A, the second correction, not the first correction, is carried out on the first grayscale value being 2048 grayscale. Moreover, in a case that the first grayscale value is 0 and the second grayscale value is 4095, the first correction to increase the first grayscale value by the first correction amount being 70 grayscale is carried out. The absolute value of the correction amount is small in a case that the first grayscale value and the second grayscale value are identical or in proximity, while the larger the difference in both of the grayscale values is, the larger the absolute value of the correction amount is. Moreover, as described previously, in a case that the first grayscale value in the first correction is in an intermediate grayscale range, the first correction is preferably not carried out. Thus, in the example in FIG. 13A, in a case that at least the first grayscale value is between 1024 and 3072 grayscale, the correction amount is 0, or the second correction is carried out. In a case that the image signal correction unit 6 is not provided with the function of the second correction and only carries out the first correction, 0 can be stored as the correction amount on the first grayscale value being 2048 grayscale.

FIG. 13B shows one example of the storage content of the LUT 624 in a case that the image signal correction unit 6 carries out the third correction and the fourth correction in addition to the first correction, while FIG. 13C shows an example of the storage content of the LUT 624 in a case that the fourth correction (or the second correction and the fourth correction) only are carried out in addition to the first correction. As shown in FIGS. 13B and 13C, the LUT 624 also comprises a storage space similar to the LUT 614 of the example in FIG. 13A, the storage space being associated with each of combinations of the first grayscale value and the second grayscale value in the third correction and the fourth correction, in which storage space, a corresponding correction amount is stored.

In FIGS. 13B and 13C, the correction amount being positive in a third region R3 in the upper-right portion represents the fourth correction amount, while the correction amount being negative in the third region R3 represents the third correction amount. On the other hand, in a fourth region R4 in the lower-left portion in FIGS. 13B and 13C, the correction amount being negative represents the fourth correction amount, while the correction amount being positive represents the third correction amount. As described previously, in a case that the second grayscale value in the third correction is in the intermediate grayscale range, the third correction is preferably not carried out. Thus, in the example in FIGS. 13B and 13C, in a case that at least the second grayscale value is between 1024 and 3072, the third correction is not carried out, but the fourth correction is carried out.

As it can be understood, the LUT 624 in the example in FIG. 13B stores therein a correction amount in a case that the third correction or the fourth correction is solely carried out on one grayscale value (the second grayscale value). Moreover, the LUT 614 in the example in FIG. 13A similarly stores therein a correction amount in a case that the first correction or the second correction is solely carried out on one grayscale value (the first grayscale value). Then, in a case that the first pixel in the first or second correction is the second pixel in the third or fourth correction, the correction amounts selected from each of the LUT 614 and LUT 624 are combined in the second addition unit 623 exemplified in FIG. 6B, for example.

For example, in a case that the grayscale value to be applied to three pixels selected consecutively changes from 0 to 2048 to 4095, the grayscale value Px to be applied to a pixel in the middle of those three pixels is corrected by both the fourth correction and the second correction. According to the examples in FIGS. 13A and 13B, this pixel (the second pixel in the fourth correction and the second pixel in the first correction) is corrected by 356 grayscale in the positive direction by the fourth correction and corrected, by the second correction, by 40 grayscale in the negative direction being a direction reverse that of the fourth correction.

However, as in the correction on the pixel P6 in FIG. 11A described previously, in a case that at least one correction should be rejected with a specific condition being fulfilled, such a measure is not realized by merely combining the correction amount stored in each LUT. For example, in a previously-described case that the grayscale value to be applied to the three pixels selected consecutively changes from 2048 to 0 to 2048 as in the example in FIG. 11A, the grayscale value Px is corrected by 40 grayscale in the positive direction by the third correction and further corrected by 40 grayscale in the positive direction by the first correction. Thus, as described previously, it would be beneficial to provide the determination unit 64 shown in FIG. 12.

On the other hand, the example in FIG. 13C is an example in which the third correction is not carried out as described previously. Thus, as it can be understood, it is possible to avoid the correction amount becoming excessively large due to the third correction and the first correction in a case such as the pixel P6 in FIG. 11A. Even more, by setting a proper correction amount in the LUT 624, for example, it is also possible to make the correction amount actually applied less than the first or second correction amount, or, make the first or second correction substantially not carried out. FIG. 13C shows such an example of the LUT 624.

With reference to FIG. 13C, in a fifth region R5 and a sixth region R6 in which the third correction amount is stored in the LUT 624 in FIG. 13B, a correction amount in the reversed positive/negative polarity relative to that third correction amount, or, in other words, the fourth correction amount is stored. Thus, the fourth correction in a combination between the first grayscale value and the second grayscale value in the fifth region R5 and the sixth region R6 is carried out. That correction amount is associated with the first correction amount shown in FIG. 13A. More specifically, the correction amount set in accordance with the combination of each grayscale value in the fifth and sixth regions R5 and R6 has an identical absolute value and the reversed positive/negative polarity relative to the correction amount set for the reverse combination with respect to the first grayscale value and the second grayscale value in the LUT 614 in FIG. 13A.

Thus, for example, in the previously-described case that the grayscale value to be applied to the three pixels selected consecutively changes from 2048 to 0 to 2048 as in the example in FIG. 11A, the grayscale value Px is corrected by 40 grayscale in the negative direction by the fourth correction and corrected by 40 grayscale in the positive direction by the first correction. In other words, the image signal correction unit 6 carries out the first correction and the fourth correction such that the direction of correction of the first grayscale value in the first correction and the direction of correction of the second grayscale value in the fourth correction are mutually reverse directions. The first correction amount and the fourth correction amount have identical absolute values with reversed positive/negative polarities, so that the two correction amounts are canceled out, and, as a result, both of the first correction and the fourth correction are rejected. For example, the LUT 624 is prepared in this way, thereby it may be possible to make the determination unit 64 as shown in FIG. 12 unnecessary.

In the present embodiment, the image signal correction unit 6, unlike the example in FIG. 1, can be provided between the timing control unit 3 and the scanning line drive circuit 5. In that case, the image signal correction unit 6 can be configured using a programmable logic device (PLD) or a field-programmable gate array (FPGA) comprising a suitable memory element, for example. In a case that the image signal correction unit 6 is provided outside the timing control unit 3, the image signal correction unit 6 can configure an image signal correction apparatus having the function previous-described for the image signal correction unit 6. Such an image signal correction apparatus can be used in combination with a display panel and timing control unit in a liquid-crystal display apparatus other than the liquid-crystal display apparatus 1.

[Image Signal Correction Method]

Next, a method for correcting image signal according to another embodiment of the present disclosure will be explained. The method for correcting image signal according to the present embodiment is executed using the image signal correction unit 6 exemplified in the explanation of the liquid-crystal display apparatus 1 according to Embodiment 1, for example. Below, with a case in which an image signal of the liquid-crystal display apparatus 1 is corrected as an example, the method for correcting image signal according to the present embodiment will be explained with reference to FIGS. 1, 6A, and 6B again, along with FIGS. 14A to 14D. Various procedures, processes, controls, and application of various signals and voltages to correct an image signal being exemplified in the previously-mentioned explanation of the liquid-crystal display apparatus 1 can be incorporated into the method for correcting image signal to be explained below without specifically indicating herein.

The method for correcting image signal according to the present embodiment is used to correct a grayscale value determined in accordance with the transmittance the pixel 4 is to have, the plurality of pixels 4 being included in the liquid-crystal display panel 2 shown in FIG. 1. The liquid-crystal display panel 2, as shown in FIG. 1, comprises the plurality of pixels 4 being arranged in a matrix, the plurality of scanning lines G1 to Gn to be supplied with a scanning line signal, the plurality of scanning lines G1 to Gn being juxtaposed in the column direction and each connected to the plurality of pixels 4 aligned in the row direction, and the plurality of data lines D1 to Dm juxtaposed in the row direction and each connected to the plurality of pixels 4 aligned in the column direction. In the liquid-crystal display apparatus 1, each grayscale value to be applied to each pixel is determined in accordance with the transmittance the plurality of pixels 4 is to have based on video data on video to be displayed by the liquid-crystal display panel 2.

As shown in FIGS. 14A and 6A, the method for correcting image signal according to the present embodiment comprises determining the first correction amount Cn1 based on the state of difference between the first grayscale value Pd1 and the second grayscale value Pd2 (step S11 in FIG. 14A). The first grayscale value Pd1 is a grayscale value determined in accordance with the transmittance that an arbitrary first pixel in the plurality of pixels 4 is to have. The second grayscale value Pd2 is a grayscale value determined in accordance with the transmittance that a second pixel is to have. Here, the second pixel is a pixel being connected to the same data line D1-Dm as the first pixel and to be selected following the first pixel. For example, in FIG. 1, in a case that the pixel 4 being connected to the data line D1 and the scanning line G1 is the first pixel and the plurality of scanning lines D1 to Dm are selected successively from the scanning line D1 to the scanning line Dm, the pixel 4 being connected to the data line D1 and the scanning line G2 is the second pixel.

In determining the first correction amount, for example, the image signal and synchronization signal IS including pixel data indicating the grayscale value to be applied to each pixel 4 is delayed by one scan period and the first grayscale value Pd1 is extracted from the delayed first image signal and synchronization signal Id1. The second grayscale value Pd2 is extracted from the second image signal and synchronization signal Id2 received at the image signal correction unit 6 following the first image signal and synchronization signal Id1. The first correction amount Cn1 is determined with reference to the LUT 614, for example, with respect to the first grayscale value Pd1 and the second grayscale value Pd2. The LUT 614 stores therein a desired correction amount according to various combinations between the first grayscale value Pd1 and the second grayscale value Pd2.

The method for correcting image signal according to the present embodiment further comprises correcting the first grayscale value Pd1 within a given range based on the first grayscale value Pd1 and the second grayscale value Pd2 so as to bring the transmittance of the second pixel closer to the transmittance according to the second grayscale value Pd2. More specifically, the method for correcting image signal according to the present embodiment comprises correcting an image signal by carrying out the first correction to bring the first grayscale value Pd1 closer to the second grayscale value by the first correction amount Cn1 (step S12 in FIG. 14A). For example, as shown in FIG. 6A, the image signal can be corrected by combining the first grayscale value Pd1 and the first correction amount Cn1.

Figure 14B:
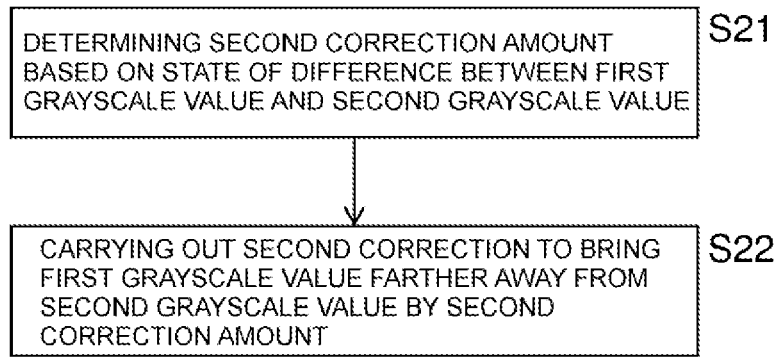
FIG. 14B is a flowchart partially showing another example of the method for correcting image signal according to another embodiment of the present disclosure.

In addition to the first correction, the method for correcting image signal according to the present embodiment, as shown in FIG. 14B, can comprise determining the second correction amount Cn2 based on the state of difference between the first grayscale value Pd1 and the second grayscale value Pd2 (step S21 in FIG. 14B) and carrying out the second correction (step S22 in FIG. 14B). The second correction is a correction to bring the transmittance of the first pixel closer to the transmittance according to the first grayscale value Pd1. Moreover, the second correction is a correction to bring the first grayscale value Pd1 within a given range farther away from the second grayscale value Pd2 by the second correction amount Cn2 determined based on the state of difference between the first grayscale value Pd1 and the second grayscale value Pd2. The second correction amount Cn2 can also be determined with reference to the LUT 614, for example. The first grayscale value Pd1 is corrected by combining the first grayscale value Pd1 with the second correction amount Cn2 as shown in FIG. 6A. The second correction is carried out on a grayscale value different from the grayscale value to be target of the first correction.

Figure 14C:
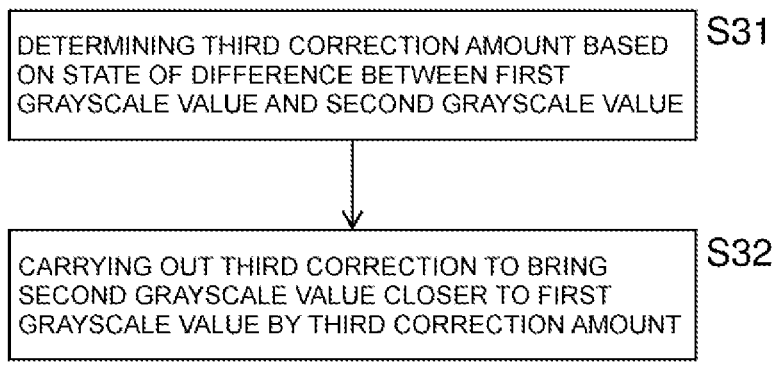
FIG. 14C is a flowchart partially showing another example of the method for correcting image signal according to another embodiment of the present disclosure.

In addition to the first correction, the method for correcting image signal according to the present embodiment, as shown in FIGS. 14C and 6B, can comprise determining the third correction amount Cn3 based on the state of difference between the first grayscale value Pd3 and the second grayscale value Pd4 (step S31 in FIG. 14C) and carrying out the third correction (step S32 in FIG. 14C). The third correction is a correction to bring the transmittance of the first pixel in the third correction closer to the transmittance according to the first grayscale value Pd3 in the third correction. Moreover, the third correction is a correction to bring the second grayscale value Pd4 in the third correction within a given range closer to the first grayscale value Pd3 in the third correction by the third correction amount Cn3 determined based on the state of difference between the first grayscale value Pd3 and the second grayscale value Pd4 in the third correction.

Figure 14D:
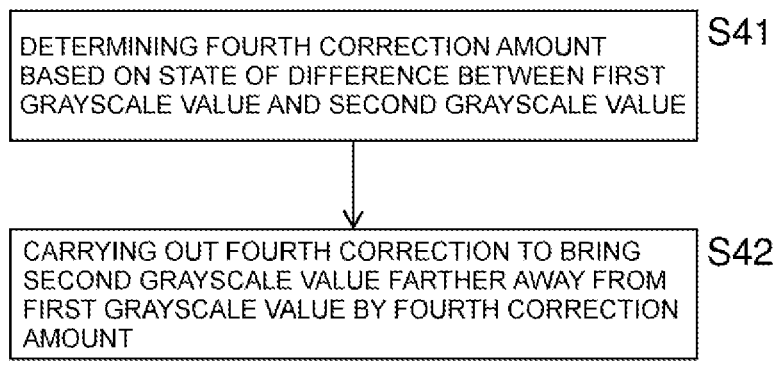
FIG. 14D is a flowchart partially showing another example of the method for correcting image signal according to another embodiment of the present disclosure.

In addition to the first correction, the method for correcting image signal according to the present embodiment, as shown in FIG. 14D and FIG. 6B, can comprise determining the fourth correction amount Cn4 based on the state of difference between the first grayscale value Pd3 and the second grayscale value Pd4 (step S41 in FIG. 14D) and carrying out the fourth correction (step S42 in FIG. 14D). The fourth correction is a correction to bring the transmittance of the second pixel in the fourth correction closer to the transmittance according to the second grayscale value Pd4 in the fourth correction. Moreover, the fourth correction is a correction to bring the second grayscale value Pd4 in the fourth correction within a given range farther away from the first grayscale value Pd3 in the fourth correction by the fourth correction amount Cn4 determined based on the state of difference between the first grayscale value Pd3 and the second grayscale value Pd4 in the fourth correction.

The first grayscale value Pd3 in the third and fourth correction, for example, as shown in FIG. 6B, can be extracted from a third image signal and synchronization signal Id3 obtained by delaying the first image signal and synchronization signal Id1 further by one scan period. Moreover, the second grayscale value Pd4 in the third and fourth correction, for example, as shown in FIG. 6B, can be extracted from the first image signal and synchronization signal Id1. Both the third correction amount Cn3 and the fourth correction amount Cn4 can be determined with reference to the LUT 624, for example, as shown in FIG. 6B. The third correction and the fourth correction can be carried out on the second grayscales Pd4 being mutually different.

In a case that the third or fourth correction is carried out in addition to the first or second correction, the first pixel in the first or second correction can be the second pixel in the third or fourth correction. In that case, as described previously, the direction of the first or second correction on a grayscale value to be corrected and the direction of the third or fourth correction on the grayscale value to be corrected can be made mutually reverse directions, where the grayscale value to be corrected is the first grayscale value Pd1 in the first or second correction and is the second grayscale value Pd4 in the third or fourth correction.

Moreover, in a case that the first pixel in the first or second correction is to be the second pixel in the third or fourth correction, either or both of the first or second correction and the third or fourth correction can be rejected. In other words, only the first or second correction can be carried out, only the third or fourth correction can be carried out, or all of these corrections may not be carried out. Thus, the method for correcting image signal according to the present embodiment can comprise determining whether the previously-described condition 1 to condition 3 are fulfilled. Then, in a case that at least the condition 1 is fulfilled, either one of the first or second correction and the third or fourth correction can be carried out, or all of these corrections may not be carried out. The unintended effect by the correction may be avoided.

In a case that at least one of the second to fourth corrections is carried out in addition to the first correction, the order thereof is not particularly limited. Moreover, any of the plurality of pixels 4 can be the first pixel and the second pixel, and the first correction or the second correction can be carried out on the first grayscale value to be applied to each of those pixels in an arbitrary scan period. Similarly, the third correction or the fourth correction can be carried out on the second grayscale value to be applied to an arbitrary pixel in of the plurality of pixels 4.

SUMMARY (1) A liquid-crystal display apparatus according to one embodiment of the present disclosure comprises a display panel comprising a plurality of pixels being arranged in a matrix, a plurality of scanning lines juxtaposed in a column direction and each connected to a plurality of pixels aligned in a row direction, and a plurality of data lines juxtaposed in the row direction and each connected to a plurality of pixels aligned in the column direction; a scanning line drive unit to successively output a scanning line signal to the plurality of scanning lines, wherein the scanning line signal selects a plurality of pixels being aligned in the row direction; a data line drive unit to output data line signals, to the plurality of data lines, for supplying voltages based on video data to the plurality of pixels being aligned in the row direction and selected by the scanning line signal; and an image signal correction unit to correct a grayscale value determined in accordance with a transmittance that the pixel is to have, wherein the image signal correction unit is configured to determine a correction amount based on a first grayscale value determined in accordance with a transmittance that a first pixel in the plurality of pixels is to have and a second grayscale value determined in accordance with a transmittance that a second pixel in the plurality of pixels is to have, the second pixel being connected to the same data line as the first pixel and to be selected following the first pixel by the scanning line signal, and the image signal correction unit carries out a first correction to bring the first grayscale value within a given range closer to the second grayscale value by a first correction amount determined based on a state of difference between the first grayscale value and the second grayscale value, the first correction being a correction for bringing a transmittance of the second pixel closer to a transmittance according to the second grayscale value.

The configuration according to (1) makes it possible to bring the transmittance of a pixel closer to a desired transmittance, making it possible to suppress deterioration of display quality of the liquid-crystal display apparatus.

(2) In the liquid-crystal display apparatus according to the aspect in (1) in the above, the image signal correction unit can further carry out a second correction to bring the first grayscale value within a given range farther away from the second grayscale value by a second correction amount determined based on a state of difference between the first grayscale value and the second grayscale value, the second correction being a correction for bringing a transmittance of the first pixel closer to a transmittance according to the first grayscale value.

(3) In the liquid-crystal display apparatus according to the aspect in (1) or (2) in the above, the image signal correction unit can further carry out a third correction to bring the second grayscale value within a given range closer to the first grayscale value by a third correction amount determined based on a state of difference between the first grayscale value and the second grayscale value, the third correction being a correction for bringing a transmittance of the first pixel closer to a transmittance according to the first grayscale value.

(4) In the liquid-crystal display apparatus according to the aspect in any one of (1) to (3) in the above, the image signal correction unit can further carry out a fourth correction to bring the second grayscale value within a given range farther away from the first grayscale value by a fourth correction amount determined based on a state of difference between the first grayscale value and the second grayscale value, the fourth correction being a correction for bringing a transmittance of the second pixel closer to a transmittance according to the second grayscale value.

(5) In the liquid-crystal display apparatus according to the aspect in any one of (2) to (4) in the above, while the first pixel is being selected, an electric potential of the data line connected to the first pixel can start changing from an electric potential based on the first grayscale value to an electric potential based on the second grayscale value. This aspect can be suitable for increasing the number of pixels, and/or the frame rate of the liquid-crystal display panel.

(6) In the liquid-crystal display apparatus according to the aspect in any one of (3) to (5) in the above, while the first pixel is being selected, an electric potential of the data line connected to the first pixel can start changing from an electric potential based on the first grayscale value to an electric potential based on the second grayscale value. This aspect can be suitable for increasing the number of pixels, and/or the frame rate of the liquid-crystal display panel.

(7) In the liquid-crystal display apparatus according to the aspect in any one of (1) to (6) in the above, each one of the plurality of pixels can display any one color in a plurality of types of colors, and the first pixel and the second pixel can display mutually the same color. This aspect can make it difficult to visually recognize the unintended effect by the correction.

(8) In the liquid-crystal display apparatus according to the aspect in any one of (1) to (7) in the above, the image signal correction unit can comprise: a first delay unit to delay an image signal received by the image signal correction unit by a time corresponding to one scan period of the display panel; a first determination unit to determine the first correction amount based on a state of difference between the first grayscale value included in a first image signal being delayed by the first delay unit and the second grayscale value included in a second image signal received subsequently to the first image signal; and a first addition unit to combine the first correction amount with the first image signal. This aspect makes it possible to easily and suitably carry out the first correction.

(9) In the liquid-crystal display apparatus according to the aspect in any one of (4) to (8) in the above, in a case that the first pixel in the first correction is to be the second pixel in the fourth correction, the direction of the first correction on a grayscale value to be corrected and the direction of the fourth correction on the grayscale value to be corrected can be in mutually reverse directions, where the grayscale value to be corrected is the first grayscale value in the first correction and is the second grayscale value in the fourth correction. This aspect can make it possible to correct the grayscale value with a suitable correction amount through the first correction and the fourth correction.

(10) In the liquid-crystal display apparatus according to the aspect in any one of (3) to (9) in the above, in a case that the first pixel in the first correction is to be the second pixel in the third correction, the image signal correction unit can determine whether a grayscale value to be corrected is a grayscale value being greater or less than both of the second grayscale value in the first correction and the first grayscale value in the third correction, the grayscale value to be corrected being the first grayscale value in the first correction and being the second grayscale value in the third correction, and in a case of a result of the determination being affirmative, the image signal correction unit can carry out either one of the first correction and the third correction, or can carry out neither the first correction nor the third correction, on the grayscale value to be corrected. According to this aspect, it may be possible to prevent the unintended effect by the correction from being visually recognized.

(11) In the liquid-crystal display apparatus according to the aspect in any one of (4) to (10) in the above, the image signal correction unit can further comprise a first correction unit comprising a first delay unit to delay an image signal received by the image signal correction unit by a time corresponding to one scan period of the display panel, wherein the first correction unit carries out the first correction based on the first grayscale value in the first correction included in a first image signal being delayed by the first delay unit and the second grayscale value in the first correction included in a second image signal received subsequently to the first image signal and outputs a corrected image signal; a second delay unit to further delay an image signal being delayed by the first delay unit by a time corresponding to one scan period of the display panel; a second determination unit to determine the fourth correction amount based on a state of difference between the first grayscale value in the fourth correction included in a third image signal and the second grayscale value in the fourth correction included in the first image signal being delayed by the first delay unit, the third image signal being received one previous to the first image signal and being delayed by the second delay unit; and a second addition unit to combine the fourth correction amount with the corrected image signal. This aspect makes it possible to easily and suitably carry out the first and fourth corrections.

(12) In the liquid-crystal display apparatus according to the aspect in any one of (4) to (11) in the above, the image signal correction unit can comprise a third delay unit to output a first delayed image signal and a second delayed image signal, the first delayed image signal being obtained by delaying an image signal received by the image signal correction unit by a time corresponding to one scan period of the display panel, and the second delayed image signal being obtained by delaying the image signal by a time corresponding to two scan periods of the display panel; and a third determination unit to determine a fifth correction amount to substitute for a correction amount combining the first correction amount and the fourth correction amount, wherein the third determination unit can determine the fifth correction amount based on both a state of difference between the first grayscale value in the first correction included in the first delayed image signal and the second grayscale value in the first correction included in the image signal and a state of difference between the first grayscale value in the fourth correction included in the second delayed image signal and the second grayscale value in the fourth correction included in the first delayed image signal. This aspect makes it possible to carry out a finer correction.

(13) In the liquid-crystal display apparatus according to the aspect in any one of (1) to (12) in the above, the given range in the first correction can be a low grayscale range or a high grayscale range. This aspect allows making it difficult for the unintended effect by the correction to be felt by a person viewing the screen and suppressing deterioration of display quality.

(14) A method for correcting image signal according to another embodiment of the present disclosure is a method for correcting image signal to correct a grayscale value in a display panel comprising a plurality of pixels being arranged in a matrix; a plurality of scanning lines to be supplied with a scanning line signal, the plurality of scanning lines being juxtaposed in a column direction and each connected to a plurality of pixels aligned in a row direction; and a plurality of data lines juxtaposed in the row direction and each connected to a plurality of pixels aligned in the column direction, wherein the grayscale value is determined in accordance with a transmittance that the pixel is to have. The method comprising: correcting the image signal based on a first grayscale value determined in accordance with a transmittance that a first pixel in the plurality of pixels is to have and a second grayscale value determined in accordance with a transmittance that a second pixel in the plurality of pixels is to have, the second pixel being connected to the same data line as the first pixel and to be selected following the first pixel by the scanning line signal supplied to the plurality of scanning lines, wherein correcting the image signal comprises carrying out a first correction to bring the first grayscale value within a given range closer to the second grayscale value by a first correction amount determined based on a state of difference between the first grayscale value and the second grayscale value, so as to bring a transmittance of the second pixel closer to a transmittance according to the second grayscale value.

The configuration according to (14) makes it possible to bring the transmittance of a pixel closer to a desired transmittance and suppress deterioration of display quality of the liquid-crystal display apparatus.

(15) In the method for correcting image signal according to the aspect in (14) in the above, correcting the image signal can further comprise carrying out a second correction to bring the first grayscale value within a given range farther away from the second grayscale value by a second correction amount determined based on a state of difference between the first grayscale value and the second grayscale value, so as to bring a transmittance of the first pixel closer to a transmittance according to the first grayscale value. This aspect may further suppress deterioration of display quality of the liquid-crystal display apparatus.

(16) In the method for correcting image signal according to the aspect in (14) or (15) in the above, correcting the image signal can further comprise carrying out a third correction to bring the second grayscale value within a given range closer to the first grayscale value by a third correction amount determined based on a state of difference between the first grayscale value and the second grayscale value, so as to bring a transmittance of the first pixel closer to a transmittance according to the first grayscale value. This aspect may further suppress deterioration of display quality of the liquid-crystal display apparatus.

(17) In the method for correcting image signal according to the aspect in any one of (14) to (16) in the above, correcting the image signal can further comprise carrying out a fourth correction to bring the second grayscale value within a given range farther away from the first grayscale value by a fourth correction amount determined based on a state of difference between the first grayscale value and the second grayscale value, so as to bring a transmittance of the second pixel closer to a transmittance according to the second grayscale value. This aspect may further suppress deterioration of display quality of the liquid-crystal display apparatus.

(18) In the method for correcting image signal according to the aspect in (17) in the above, correcting the image signal can comprise, in a case that the first pixel in the first correction is to be the second pixel in the fourth correction, making a direction of the first correction on a grayscale value to be corrected and a direction of the fourth correction on the grayscale value to be corrected mutually reverse directions, where the grayscale value to be corrected is the first grayscale value in the first correction and is the second grayscale value in the fourth correction. According to this aspect, it may be possible to correct the grayscale value with a suitable correction amount through the first correction and the fourth correction.

(19) In the method for correcting image signal according to the aspect in any one of (16) to (18) in the above, correcting the image signal can comprise, in a case that the first pixel in the first correction is to be the second pixel in the third correction, determining whether a grayscale value to be corrected is a grayscale value being greater or less than both of the second grayscale value in the first correction and the first grayscale value in the third correction, the grayscale value to be corrected being the first grayscale value in the first correction and being the second grayscale value in the third correction; and in a case of a result of the determination being affirmative, carrying out either one of the first correction and the third correction, or carrying out neither the first correction nor the third correction, on the grayscale value to be corrected. According to this aspect, it may be possible to prevent the unintended effect by the correction from being visually recognized.

What is claimed is:
1. A liquid-crystal display apparatus comprising:
a display panel comprising a plurality of pixels being arranged in a matrix, a plurality of scanning lines juxtaposed in a column direction and each connected to a plurality of pixels aligned in a row direction, and a plurality of data lines juxtaposed in the row direction and each connected to a plurality of pixels aligned in the column direction;
a scanning line drive unit to successively output a scanning line signal to the plurality of scanning lines, wherein the scanning line signal selects a plurality of pixels being aligned in the row direction;

a data line drive unit to output data line signals, to the plurality of data lines, for supplying voltages based on video data to the plurality of pixels being aligned in the row direction and selected by the scanning line signal; and an image signal correction unit to correct a grayscale value determined in accordance with a transmittance that the pixel is to have, wherein the image signal correction unit is configured to determine a correction amount based on a first grayscale value determined in accordance with a transmittance that a first pixel in the plurality of pixels is to have and a second grayscale value determined in accordance with a transmittance that a second pixel in the plurality of pixels is to have, the second pixel being connected to the same data line as the first pixel and to be selected following the first pixel by the scanning line signal, and the image signal correction unit carries out a first correction to bring the first grayscale value within a given range closer to the second grayscale value by a first correction amount determined based on a state of difference between the first grayscale value and the second grayscale value, the first correction being a correction for bringing a transmittance of the second pixel closer to a transmittance according to the second grayscale value.

2. The liquid-crystal display apparatus according to claim 1, wherein the image signal correction unit further carries out a second correction to bring the first grayscale value within a given range farther away from the second grayscale value by a second correction amount determined based on a state of difference between the first grayscale value and the second grayscale value, the second correction being a correction for bringing a transmittance of the first pixel closer to a transmittance according to the first grayscale value.

3. The liquid-crystal display apparatus according to claim 2, wherein, while the first pixel is being selected, an electric potential of the data line connected to the first pixel starts changing from an electric potential based on the first grayscale value to an electric potential based on the second grayscale value.

4. The liquid-crystal display apparatus according to claim 1, wherein the image signal correction unit further carries out a third correction to bring the second grayscale value within a given range closer to the first grayscale value by a third correction amount determined based on a state of difference between the first grayscale value and the second grayscale value, the third correction being a correction for bringing a transmittance of the first pixel closer to a transmittance according to the first grayscale value.

5. The liquid-crystal display apparatus according to claim 4, wherein, while the first pixel is being selected, an electric potential of the data line connected to the first pixel starts changing from an electric potential based on the first grayscale value to an electric potential based on the second grayscale value.

6. The liquid-crystal display apparatus according to claim 1, wherein the image signal correction unit further carries out a fourth correction to bring the second grayscale value within a given range farther away from the first grayscale value by a fourth correction amount determined based on a state of difference between the first grayscale value and the second grayscale value, the fourth correction being a correction for bringing a transmittance of the second pixel closer to a transmittance according to the second grayscale value.

7. The liquid-crystal display apparatus according to claim 6, wherein, in a case that the first pixel in the first correction is to be the second pixel in the fourth correction, the direction of the first correction on a grayscale value to be corrected and the direction of the fourth correction on the grayscale value to be corrected are to be in mutually reverse directions, the grayscale value to be corrected being the first grayscale value in the first correction and being the second grayscale value in the fourth correction.

8. The liquid-crystal display apparatus according to claim 4, wherein, in a case that the first pixel in the first correction is to be the second pixel in the third correction, the image signal correction unit:

determines whether a grayscale value to be corrected is a grayscale value being greater or less than both of the second grayscale value in the first correction and the first grayscale value in the third correction, the grayscale value to be corrected being the first grayscale value in the first correction and being the second grayscale value in the third correction; and in a case of a result of the determination being affirmative, carries out either one of the first correction and the third correction, or carries out neither the first correction nor the third correction, on the grayscale value to be corrected.

9. The liquid-crystal display apparatus according to claim 6, wherein the image signal correction unit comprises:

a first correction unit comprising a first delay unit to delay an image signal received by the image signal correction unit by a time corresponding to one scan period of the display panel, wherein the first correction unit carries out the first correction based on the first grayscale value in the first correction included in a first image signal being delayed by the first delay unit and the second grayscale value in the first correction included in a second image signal received subsequently to the first image signal and outputs a corrected image signal;

a second delay unit to further delay an image signal being delayed by the first delay unit by a time corresponding to one scan period of the display panel;

a second determination unit to determine the fourth correction amount based on a state of difference between the first grayscale value in the fourth correction included in a third image signal and the second grayscale value in the fourth correction included in the first image signal being delayed by the first delay unit, the third image signal being received one previous to the first image signal and being delayed by the second delay unit; and a second addition unit to combine the fourth correction amount with the corrected image signal.

10. The liquid-crystal display apparatus according to claim 6, wherein the image signal correction unit comprises:

a third delay unit to output a first delayed image signal and a second delayed image signal, the first delayed image signal being obtained by delaying an image signal received by the image signal correction unit by a time corresponding to one scan period of the display panel, and the second delayed image signal being obtained by delaying the image signal by a time corresponding to two scan periods of the display panel; and a third determination unit to determine a fifth correction amount to substitute for a correction amount combining the first correction amount and the fourth correction amount, wherein the third determination unit determines the fifth correction amount based on both a state of difference between the first grayscale value in the first correction included in the first delayed image signal and the second grayscale value in the first correction included in the image signal and a state of difference between the first grayscale value in the fourth correction included in the second delayed image signal and the second grayscale value in the fourth correction included in the first delayed image signal.

11. The liquid-crystal display apparatus according to claim 1, wherein each one of the plurality of pixels displays any one color in a plurality of types of colors, and the first pixel and the second pixel display mutually the same color.

12. The liquid-crystal display apparatus according to claim 1, wherein the image signal correction unit comprises:
a first delay unit to delay an image signal received by the image signal correction unit by a time corresponding to one scan period of the display panel;
a first determination unit to determine the first correction amount based on a state of difference between the first grayscale value included in a first image signal being delayed by the first delay unit and the second grayscale value included in a second image signal received subsequently to the first image signal; and
a first addition unit to combine the first correction amount with the first image signal.

13. The liquid-crystal display apparatus according to claim 1, wherein the given range in the first correction is a low grayscale range or a high grayscale range.

14. A method for correcting image signal in a display panel comprising a plurality of pixels being arranged in a matrix; a plurality of scanning lines to be supplied with a scanning line signal, the plurality of scanning lines being juxtaposed in a column direction and each connected to a plurality of pixels aligned in a row direction; and a plurality of data lines juxtaposed in the row direction and each connected to a plurality of pixels aligned in the column direction, wherein a grayscale value determined in accordance with a transmittance that the pixel is to have is corrected, the method comprising:
correcting the image signal based on a first grayscale value determined in accordance with a transmittance that a first pixel in the plurality of pixels is to have and a second grayscale value determined in accordance with a transmittance that a second pixel in the plurality of pixels is to have, the second pixel being connected to the same data line as the first pixel and to be selected following the first pixel by the scanning line signal supplied to the plurality of scanning lines, wherein
correcting the image signal comprises carrying out a first correction to bring the first grayscale value within a given range closer to the second grayscale value by a first correction amount determined based on a state of difference between the first grayscale value and the second grayscale value, so as to bring a transmittance of the second pixel closer to a transmittance according to the second grayscale value.

15. The method for correcting image signal according to claim 14, wherein correcting the image signal further comprises carrying out a second correction to bring the first grayscale value within a given range farther away from the second grayscale value by a second correction amount determined based on a state of difference between the first grayscale value and the second grayscale value, so as to bring a transmittance of the first pixel closer to a transmittance according to the first grayscale value.

16. The method for correcting image signal according to claim 14, wherein correcting the image signal further comprises carrying out a third correction to bring the second grayscale value within a given range closer to the first grayscale value by a third correction amount determined based on a state of difference between the first grayscale value and the second grayscale value, so as to bring a transmittance of the first pixel closer to a transmittance according to the first grayscale value.

17. The method for correcting image signal according to claim 16, wherein correcting the image signal comprises, in a case that the first pixel in the first correction is to be the second pixel in the third correction,
determining whether a grayscale value to be corrected is a grayscale value being greater or less than both of the second grayscale value in the first correction and the first grayscale value in the third correction, the grayscale value to be corrected being the first grayscale value in the first correction and being the second grayscale value in the third correction; and in a case of a result of the determination being affirmative,
carrying out either one of the first correction and the third correction, or carrying out neither the first correction nor the third correction, on the grayscale value to be corrected.

18. The method for correcting image signal according to claim 14, wherein correcting the image signal further comprises carrying out a fourth correction to bring the second grayscale value within a given range farther away from the first grayscale value by a fourth correction amount determined based on a state of difference between the first grayscale value and the second grayscale value, so as to bring a transmittance of the second pixel closer to a transmittance according to the second grayscale value.

19. The method for correcting image signal according to claim 18, wherein correcting the image signal comprises, in a case that the first pixel in the first correction is to be the second pixel in the fourth correction, making a direction of the first correction on a grayscale value to be corrected and a direction of the fourth correction on the grayscale value to be corrected mutually reverse directions, the grayscale value to be corrected being the first grayscale value in the first correction and being the second grayscale value in the fourth correction.

* * * * *